United States Patent [19]

Masuzawa et al.

[11] 4,429,182

[45] Jan. 31, 1984

[54] DATA-RELATED APPARATUS WITH A SPEECH-SYNTHESIZER OUTPUT DEVICE

[75] Inventors: Sigeaki Masuzawa, Nara; Akira Tanimoto, Kashihara, both of Japan

[73] Assignee: Sharp Kabushiki Kaisha, Osaka, Japan

[21] Appl. No.: 288,333

[22] Filed: Jul. 30, 1981

Related U.S. Application Data

[63] Continuation of Ser. No. 61,247, Jul. 27, 1979, abandoned.

[30] Foreign Application Priority Data

Jul. 28, 1978 [JP] Japan .................................. 53-93037

[51] Int. Cl.$^3$ .................................................. G10L 1/00
[52] U.S. Cl. ....................................... 381/51; 364/710
[58] Field of Search .................................. 179/1 SM; 364/200 MS File, 900 MS File, 513, 710

[56] References Cited

U.S. PATENT DOCUMENTS

| | | | |
|---|---|---|---|
| 4,000,565 | 1/1977 | Overby et al. | 364/710 |
| 4,060,848 | 11/1977 | Hyatt | 179/1 SM |
| 4,185,169 | 1/1980 | Tanimoto et al. | 179/1 SM |
| 4,185,170 | 1/1980 | Morino et al. | 179/1 SM |

Primary Examiner—Emanuel S. Kemeny
Attorney, Agent, or Firm—Birch, Stewart, Kolasch & Birch

[57] ABSTRACT

An audible output device disclosed herein for use in electronic calculators or the like is able to distinguish between audible messages at the time of keying input information and at the time delivering output information reflecting results of operations, for example. The audibel output device relies upon a speech-synthesizer technique which can be implemented with a digital LSI device.

5 Claims, 10 Drawing Figures

DATA-RELATED APPARATUS WITH A SPEECH-SYNTHESIZER OUTPUT DEVICE

This application is a continuation of copending application Ser. No. 061,247, filed on July 27, 1979.

BACKGROUND OF THE INVENTION

This invention relates to a key input type data-related apparatus conveying audible output messages, for example, a speech-synthesizer calculator.

The purpose of the present invention is to provide an audible output apparatus which is able to distinguish between audible messages at the time of keying input information and at the time of delivering output information reflecting results of operations, for example.

As a rule, in electronic calculators, etc, in which keys are actuated in a desired order and calculations are performed on keyed information in order to yield calculation results, typical examples of the application of a speech synthesizing technique contain generally (1) the delivery of audible messages indicative of keyed information at the time of key actuations and (2) the automatic delivery of audible messages indicative of calculation results immediately upon the completion of calculations.

The audible messages of the calculation results are very convenient for the operators' transcription. In the case where a person operates a calculator and another transcribes the calculation results derived therefrom onto a sheet of paper or a person actuates keys in succession and upon the delivery of calculation results actuates quickly digit keys to commence further calculations, both the keyed information and the processed information (the calculation results) are numerical data, thus presenting difficulties for the operator in knowing when the messages change from the first keyed information to the second calculation results.

OBJECTS AND SUMMARY OF THE INVENTION

It is therefore an object of the present invention to provide an apparatus in which particular linguistic information is inserted in the form of audible sounds just after the delivery of audible messages of operation results and in substantially the same manner as of the audible answer messages.

For example, for calculator use, if the operator introduces a value B and actuates an "=" key in the order of A $\boxed{X}$ B $\boxed{=}$ , then, its answer is calculated forthwith with a vague distinction (for example, no natural pause). In this case, the linguistic information such as "KOTAE" or "KOTAEWA" (in its English version ANSWER) is provided in the form of audible sounds according to the present invention. In this way, the linguistic information "KOTAEWA ... DESU" (in its English version IS with a difference in its place between Japanese and English) is provided audibly upon actuation of the key "=".

It is another object of the present invention to provide an apparatus which can provide an audible output indicative of a preceeding actuated key upon actuation of a particular key, thus presenting the possibility of confirming what kind of keys were previously actuated.

In one preferred form of the present invention, necessary information is displayed both audibly and visually, enhancing availability for transcription and check in a speech-synthesizer apparatus and particularly in speech-synthesizer calculators. While it is necessary to increase the capacity of a visual display in order to extend visual messages, an audible output device can be implemented with an LSI technology and extensible in length without an increase in circuit construction and cost of the overall apparatus.

The present invention further makes it possible to confirm whether any keys have been previously actuated, without changing a visual display. With such an arrangement, in the case where a calculation of 125×670, for example, is being executed but is interrupted for a certain reason, the possibility of audibly confirming, without any change in a visual display, whether a key $\boxed{X}$ has actually been actuated is very helpful. Failure to realize whether the key $\boxed{X}$ has been keyed may result in an answer being 125670 in response to subsequent actuations of keys "6", "7" and "0". In this manner, another object of the present invention is to enable precise key entry procedures while the previous state is decided audibly prior to key actuations.

BRIEF DESCRIPTION OF THE DRAWINGS

For a more complete understanding of the present invention and for further objects and advantages thereof, reference is now made to the following description taken in conjunction with the accompanying drawings, in which.

DETAILED DESCRIPTION OF THE PREFERRED EMBODIMENTS

Figure 1:
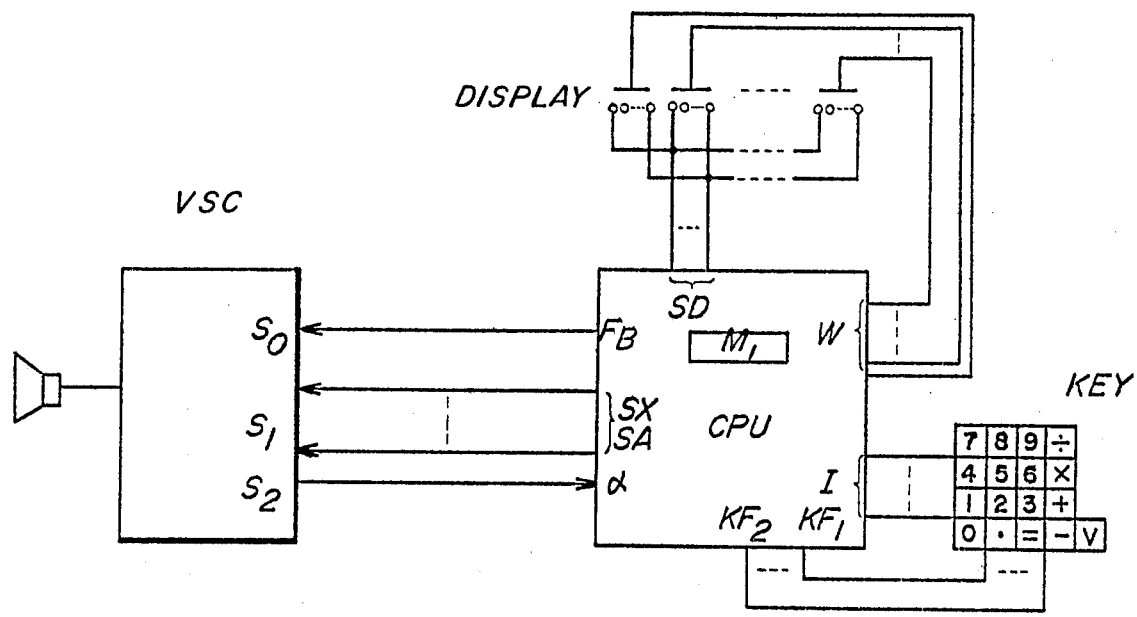
FIG. 1 is a block diagram of a speech-synthesizer calculator according one preferred embodiment of the present invention.

Referring now to FIG. 1, there is illustrated a block diagram of a speech-synthesizer calculator according to one preferred embodiment of the present invention. A detailed disclosure of operation and structure of a microprocessor CPU are shown in FIGS. 2A–2D.

A dynamic mode display DSP has digit selection electrodes connected to terminals "W" of CPU and segment selection electrodes connected to terminals "SD" of CPU for displaying the contents of a memory $M_1$ (RAM) of CPU. A key input unit KEY is connected to an I terminal and $KN_1$, $KN_2$, $KF_1$ and $KF_2$ terminals of CPU.

A key "V" in the key input device KEY is to enable the contents of a preceding actuated key to be audibly displayed. The contents of the memory $M_1$ are both audibly and visually displayed, data being derived from stack registers SX and SA for generating audible messages. A voice synthesizer circuit VSC (see FIG. 4) receives words to be voiced from the stack registers SC and SA when an input signal $S_0$ comes. The input $S_0$ is connected to a flag flip flop (F/F) $F_B$ in CPU.

Figure 3:
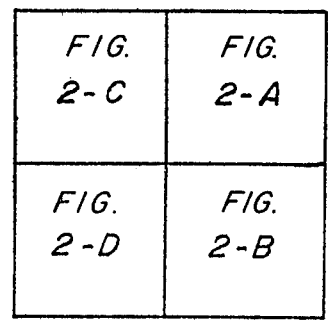
FIG. 3 is a composite representation of the CPU shown in FIGS. 2A through 2D.
Figure 2A:
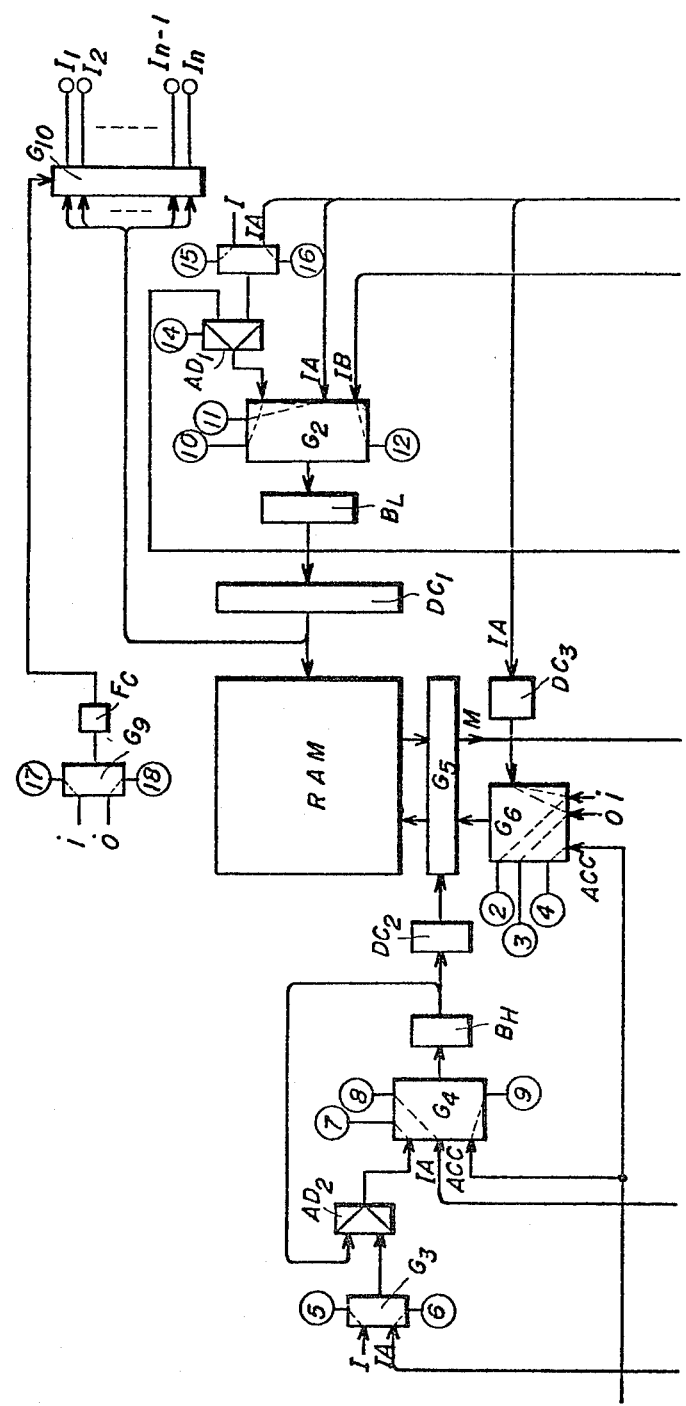
FIGS. 2A–2D are logic circuit diagram of a microprocessor CPU.
Figure 2B:
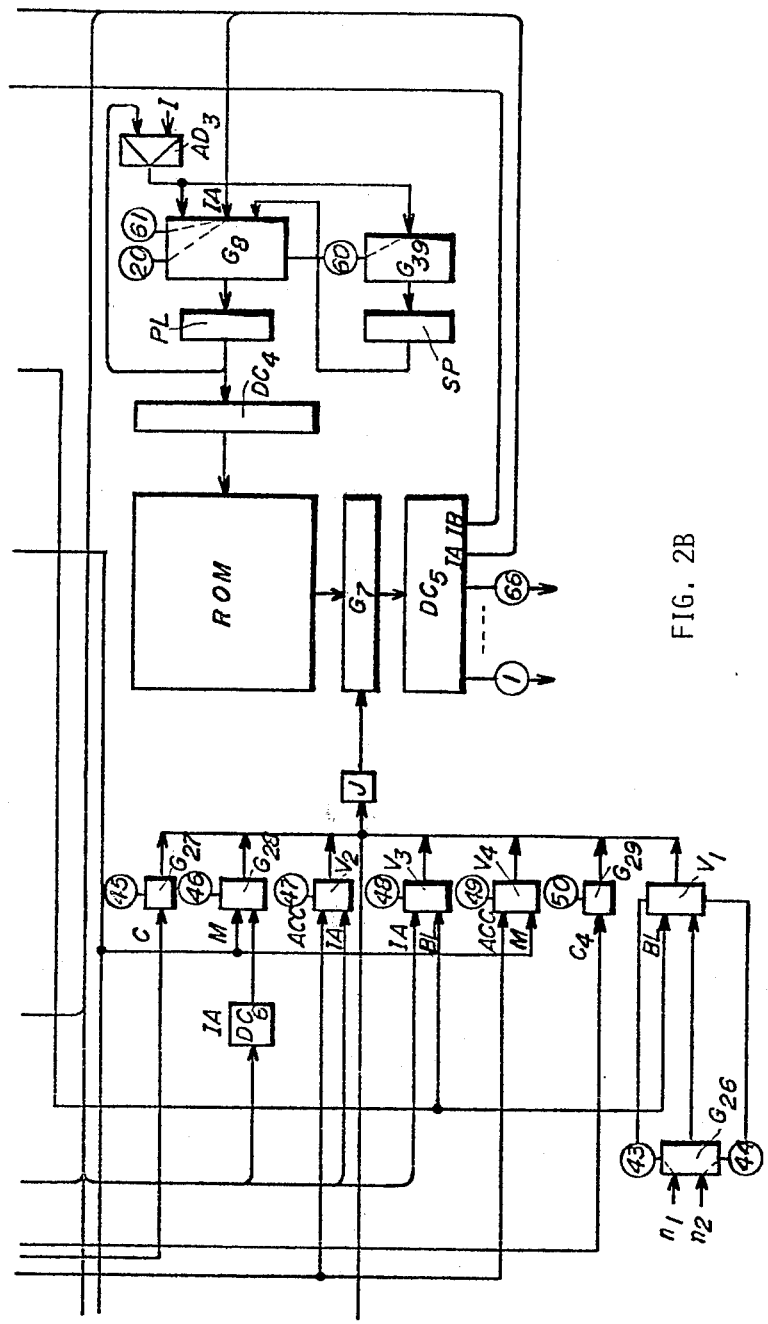
Figure 2C:
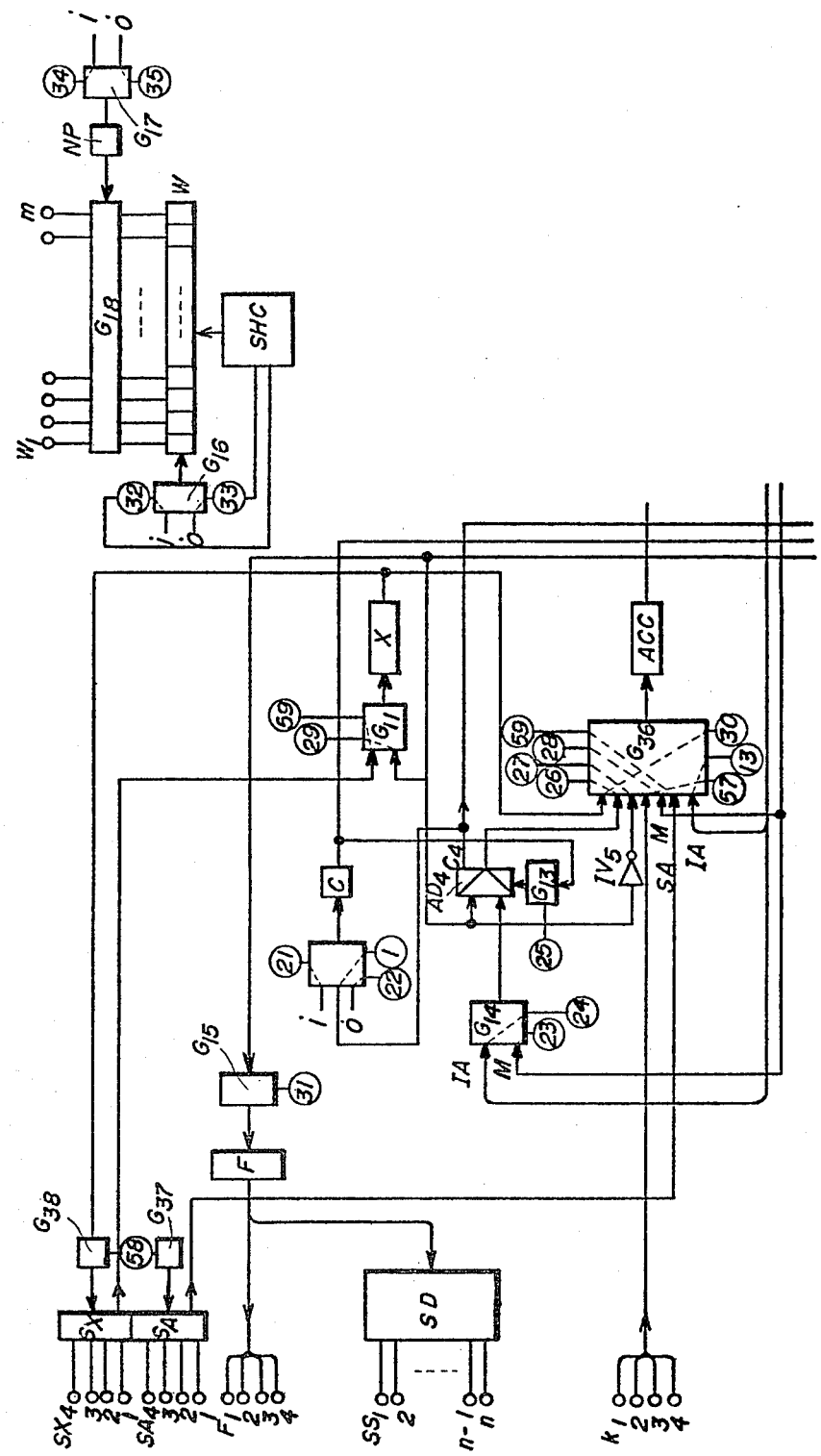
Figure 2D:
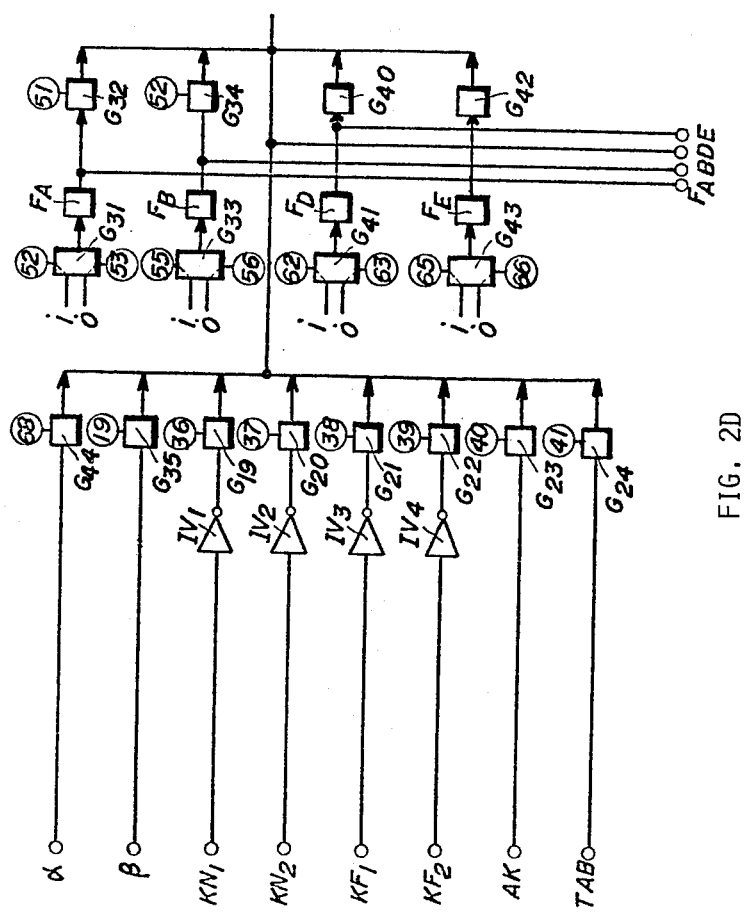

A confirmation signal $S_2$ concerning the completion of the delivery of audible messages is developed from VSC. CPU receives an input $\alpha$. FIG. 3, a composite diagram of FIGS. 2A–2D, shows a logic wiring diagram of a specific example of the CPU scheme.

FIG. 3 shows how to combine FIGS. 2A–2D concerning the CPU. The following will set forth a logic structure of the CPU.

[CPU ARCHITECTURE]

A random access memory RAM is of a 4 bit input and output capacity and accessible to a specific digit position thereof as identified by a digit address and a file address. The RAM includes a digit address counter BL, a digit address decoder $DC_1$, a file address counter BM, a file address decoder $DC_2$ and an adder $AD_1$ which serves as an adder and a subtractor respectively in the absence and presence of a control instruction (14). It further includes a second adder $AD_2$ and a gate $G_1$ for providing either a digit "1" or an operand $I_A$ to an input to the adder/subtractor $AD_1$ and delivering I or $I_A$ when a control instruction (15) or (16) is developed, respectively. An input gate $G_2$ is provided for the memory digit address counter BL, which enables the output of the adder/subtractor $AD_1$, the operand $I_A$ and another operand $I_B$ to pass therethrough respectively when control instructions (10), (11) and (12) are developed. A gate $G_3$ is disposed to provide a digit "1" or the operand $I_A$ to an input to the adder/subtractor, the former being provided upon the development of an instruction (5) and the latter upon the development of an instruction (6). A gate $G_4$ is an input gate to the memory file address BM which enables the output of the adder $AD_2$, the operand $I_A$ and the contents of an accumulator ACC to pass upon the development of instructions (7), (8) and (9). A file selection gate $G_5$ is further provided for the memory RAM. A decoder $DC_3$ translates the operand $I_A$ and supplies a gate $G_6$ with a desired bit specifying signal. The gate $G_6$ contains a circuit arrangement for introducing a binary code "1" into a specific bit position of the memory identified by the operand decoder $DC_3$ and a binary code "D" into a specific bit position identified by $DC_3$, respectively, when a control instruction (2) or (3) is developed. Upon the development of an instruction (4) the contents of the accumulator ACC are read out.

A read only memory ROM has its associated program counter PL which specifies a desired step in the read only memory ROM. The read only memory ROM further contains a step access decoder $DC_4$ and an output gate $G_7$ which shuts off transmission of the output of the ROM to an instruction decoder $DC_5$ when a judge flip flop F/F J is set. The instruction decoder $DC_5$ is adapted to decode instruction codes derived from the ROM and divide them into an operation code area $I_O$ and operand areas $I_A$ and $I_B$, the operation code being decoded into any control instruction (1)–(61). The decoder $DC_5$ is further adapted to output the operand $I_A$ or $I_B$ as it is when sensing an operation code accompanied by an operand. An adder $AD_3$ increments one the contents of the program counter PL. An input gate $G_8$ associated with the program counter PL provides the operand $I_A$ and transmits the contents of a program stack register SP when the instructions (20) and (61) are developed, respectively. When the instructions (20), (61) and (60) are being processed, any output of the adder $AD_3$ is not transmitted. Otherwise the $AD_3$ output is transmitted to automatically load "1" into the contents of the program counter PL. A flag flip flop FC has an input gate $G_9$ therefor which introduces binary codes "1" and "0" into the flag flip flop FC when the instructions (17) and (18) are developed, respectively. A key signal generating gate $G_{10}$ provides the output of the memory digit address decoder $DC_1$ without any change when the flag F/F FC is in the reset state (0), and renders all outputs $I_1$–$I_n$ "1" whatever output $DC_1$ provides when FC is in the set state (1). The accumulator ACC is 4 bits long and a temporary register X is also 4 bits long. An input gate $G_{11}$ for the temporary register X transmits the contents of the accumulator ACC and the stack register SX respectively upon the development of the instructions (29) and (59). An adder $AD_4$ executes a binary addition on the contents of the accumulator ACC and other data. The output $C_4$ of the adder $AD_4$ assumes "1" when the fourth bit binary addition yields a carry. A carry F/F C has its associated input gate $G_{12}$ which sets "1" into the carry F/F C in the presence of "1" of the fourth bit carry $C_4$ and "0" into the same in the absence of $C_4(0)$. "1" and "0" are set into C upon the development of (21) and (22), respectively. A carry (C) input gate $G_{13}$ enables the adder $AD_4$ to perform binary additions with a carry and thus transmits the output of the carry F/F C into the adder $AD_4$ in response to the instruction (25). An input gate $G_{14}$ is provided for the adder $AD_4$ and transfers the output of the memory RAM and the operand $I_A$ upon the development of (23) and (24), respectively. An output buffer register F has a 4 bit capacity and an input gate which enables the contents of the accumulator ACC to enter into F upon the development of (31). An output decoder SD decodes the contents of the output buffer F into display segment signals $SS_1$–$SS_n$. An output buffer register W has a shift circuit SHC which shifts the overall bit contents of the output buffer register W one bit to the right at a time in response to (32) or (33). An input gate $G_{16}$ for the output buffer register W enters "1" and "0" into the first bit position of W upon (32) and (33), respectively. Immediately before "1" or or "0" enters into the first bit position of W the output buffer shift circuit SHC becomes operative.

An output control flag F/F $N_p$ has an input gate $G_{17}$ for receiving "1" and "0" upon the development of (34) and (35), respectively.

The buffer register W is provided with an output control gate $G_{18}$ for providing the respective bit outputs thereof at one time only when the flag F/F $N_p$ is in the set state (1). There are further provided a judge F/F J, inverters $IV_1$–$IV_4$ and an input gate $G_{19}$ for the judge F/F J for transferring the state of an input $KN_1$ into J upon the development of (36). In the case where $KN_1=0$, J=1 because of intervention of the inverter $IV_1$. An input gate $G_{20}$ for the judge F/F J is adapted to transfer the state of an input $KN_2$ into J upon (38). When $KF_1=0$, J=1 becuase of intervention of the inverter $IV_3$. An input gate $G_{22}$ for the judge F/F J is adapted to transfer the state of the input $KF_2$ into J upon (39). When $KF_2=0$, J=1 because of the intervened inverter $IV_4$. An input gate $G_{23}$ is provided for the judge flip flop J for transmission of the state of an input AK into J upon the development of (40). When AK=1, J=1. An input gate $G_{24}$ is provided for the judge flip flop J to transmit the state of an input TAB into J pursuant to (41). When TAB=1, J=1. A gate $G_{25}$ is provided for setting the judge F/F J upon the development of (42). A comparator $V_1$ compares the contents of the memory digit address counter BL with preselected data and provides an output "1" if there is agreement. The comparator $V_1$ becomes operative when (43) or (44) is developed. The data to be compared are derived from a gate $G_{26}$ which is an input gate to the comparator $V_1$. The data $n_1$ to be compared are a specific higher address value which is often available in controlling the RAM. $n_1$ and $n_2$ are provided for comparison purposes upon the development of (43) and (44), respectively.

An input gate $G_{27}$ is provided for the decision F/F J to enter "1" into J when the carry F/F C assumes "1" upon the development of (45).

A decoder $DC_6$ decodes the operand $I_A$ and helps decisions as to whether or not the contents of a desired bit position of the RAM are "1". A gate $G_{28}$ trnasfers the contents of the RAM as specified by the operand decoder $DC_6$ into the judge F/F when (46) is derived. When the specified bit position of the RAM assumes "1", J=1. A comparator $V_2$ decides whether or not the contents of the accumulator ACC are equal to the operand $I_A$ and provides an output "1" when the affirmative answer is provided. The comparator $V_2$ becomes operative according to (47). A comparator $V_3$ decides under (48) whether the contents of the memory digit address counter BL are equal to the operand $I_A$ and provides an output "1" when the affirmative answer is obtained. A comparator $V_4$ decides whether the contents of the accumulator ACC agree with the contents of the RAM and provides an output "1" in the presence of the agreement. A gate $G_{29}$ transfers the fourth bit carry $C_4$ occurring during additions into the judge F/F J. Upon the development of (50) $C_4$ is sent to F/F J. J=1 in the presence of $C_4$. A flag flip flop FA has an input gate $G_{31}$ which provides outputs "1" and "0" upon the development of (52) and (53), respectively. An input gate $G_{32}$ is provided for setting the judge F/F J when the flag flip flop FA assumes "1". A flag flip flop $F_B$ also has an input gate $G_{33}$ which provides outputs "1" and "0" upon (55) and (56), respectively. An input gate $G_{34}$ for the judge flip flop J is adapted to transfer the contents of the flag flip flop $F_B$ into the F/F J upon the development of (54). An input gate $G_{35}$ associated with the judge F/F J is provided for transmission of the contents of an input B upon (19). When B=1, J=1. An input gate $G_{36}$ associated with the accumulator ACC is provided for transferring the output of the adder $AD_4$ upon (26) and transferring the contents of the accumulator ACC after inverted via an inverter $IV_5$ upon (27). The contents of the memory RAM are transferred upon (28), the operand $I_A$ upon (13), the 4 bit input contents $k_1$-$k_4$ upon (57), and the contents of the stack register SA upon (59). A stack register SA provides the output outside the present system. A stack register SX also provides the output outside the system. An input gate $G_{37}$ associated with the stack register SA transfers the accumulator ACC upon (58). An input gate $G_{38}$ associated with the stack register SX transfers the contents of the temporary register X. A program stack register SP has an input gate $G_{39}$ for loading the contents of the program counter PL incremented by "1" through the adder into the program stack register.

An illustrative example of the instruction codes contained within the ROM of the CPU structure, the name and function of the instruction codes and the control instructions developed pursuant to the instruction codes will now be tabulated in Table 1 wherein A: the instruction codes, B: the instruction name, C: the instruction description and D: the CPU control instructions.

TABLE 1

| # | A | | | B | D |
|---|---|---|---|---|---|
| 1 | $I_O$ | | | SKIP | (43) |
| 2 | $I_O$ | | | AD | (23) (26) |
| 3 | $I_O$ | | | ADC | (23) (26) (25) (1) |
| 4 | $I_O$ | | | ADCSK | (23) (26) (25) (50) (1) |
| 5 | $I_O$ | $I_A$ | | ADI | (24) (26) (50) |
| 6 | $I_O$ | $I_A$ | | DC | (24) (26) (50) |
| 7 | $I_O$ | | | SC | (21) |
| 8 | $I_O$ | | | RC | (22) |
| 9 | $I_O$ | $I_A$ | | SM | (2) |
| 10 | $I_O$ | $I_A$ | | RM | (3) |
| 11 | $I_O$ | | | COMA | (27) |
| 12 | $I_O$ | $I_A$ | | LDI | (13) |
| 13 | $I_O$ | $I_A$ | | L | (28) (8) |
| 14 | $I_O$ | $I_A$ | | LI | (28) (8) (15) (10) (43) |
| 15 | $I_O$ | $I_A$ | | XD | (28) (8) (14) (15) (10) (44) |
| 16 | $I_O$ | $I_A$ | | X | (28) (4) (8) |
| 17 | $I_O$ | $I_A$ | | XI | (28) (8) (15) (10) (43) |
| 18 | $I_O$ | $I_A$ | | XD | (28) (4) (8) (14) (16) (10) (44) |
| 19 | $I_O$ | $I_A$ | | LBLI | (11) |
| 20 | $I_O$ | $I_A$ | $I_B$ | LB | (8) (12) |
| 21 | $I_O$ | $I_A$ | | ABLI | (16) (10) (43) |
| 22 | $I_O$ | $I_A$ | | ABMI | (6) (7) |
| 23 | $I_O$ | $I_A$ | | T | (20) |
| 24 | $I_O$ | | | SKC | (45) |
| 25 | $I_O$ | $I_A$ | | SKM | (46) |
| 26 | $I_O$ | $I_A$ | | SKBI | (48) |
| 27 | $I_O$ | $I_A$ | | SKAI | (47) |
| 28 | $I_O$ | | | SKAM | (49) |
| 29 | $I_O$ | | | $SKN_1$ | (36) |
| 30 | $I_O$ | | | $SKN_2$ | (37) |
| 31 | $I_O$ | | | $SKF_1$ | (38) |
| 32 | $I_O$ | | | $SKF_2$ | (39) |
| 33 | $I_O$ | | | SKAK | (40) |
| 34 | $I_O$ | | | SKTAB | (41) |
| 35 | $I_O$ | | | SKFA | (51) |
| 36 | $I_O$ | | | SKFB | (54) |
| 37 | $I_O$ | | | WIS | (52) |
| 38 | $I_O$ | | | WIR | (53) |
| 39 | $I_O$ | | | NPS | (34) |
| 40 | $I_O$ | | | NPR | (35) |
| 41 | $I_O$ | | | ATF | (31) |
| 42 | $I_O$ | | | LXA | (29) |
| 43 | $I_O$ | | | XAX | (29) (30) |
| 44 | $I_O$ | | | SFA | (32) |
| 45 | $I_O$ | | | RFA | (33) |
| 46 | $I_O$ | | | SFB | (55) |
| 47 | $I_O$ | | | RFB | (56) |
| 48 | $I_O$ | | | SFC | (17) |
| 49 | $I_O$ | | | RFC | (18) |
| 50 | $I_O$ | | | SKB | (19) |
| 51 | $I_O$ | | | KTA | (57) |
| 52 | $I_O$ | | | STPO | (58) |
| 53 | $I_O$ | | | EXPO | (58) (59) |
| 54 | $I_O$ | $I_A$ | | TML | (62) (60) |
| 55 | $I_O$ | | | RIT | (61) |

INSTRUCTION DESCRIPTION (C)

(1) SKIP
Only the program counter PL is incremented without executing a next program step instruction, thus skipping a program step (2) AD
A binary addition is effected on the contents of the accumulator ACC and the contents of the RAM, the addition results being loaded back into the accumulator ACC.

(3) ADC
A binary addition is effected on the contents of the accumulator ACC, the memory RAM and the carry F/F C, the results being loaded back to the accumulator ACC.

(4) ADCSK
A binary addition is effected on the contents of the accumulator ACC, the memory RAM and the carry flip flop C, the results being loaded into the accumulator ACC. If the fourth bit carry $C_4$ occurs in the results, then a next program step is skipped.

(5) ADI

A binary addition is achieved upon the contents of the accumulator ACC and the operand $I_4$ and the results are loaded into the accumulator ACC. If the fourth bit carry $C_4$ is developed in the addition results, then a next program step is skipped.

(6) DC

The operand $I_4$ is fixed as "1010" (a decimal number "10") and a binary addition is effected on the contents of the accumulator ACC and the operand $I_4$ in the same way as in the ADI instruction. The decimal number 10 is added to the contents of the accumulator ACC, the results of the addition being loaded into ACC.

(7) SC

The carry F/F C is set ("1" enters into C).

(8) RC

The carry F/F C is reset ("0" enters into C).

(9) SM

The contents of the operand $I_4$ are decoded to give access to a desired bit position of the memory specified by the operand ("1" enters).

(10) RM

The contents of the operand $I_4$ are interpreted to reset a desired bit position of the memory specified by the operand ("0" enters).

(11) COMA

The respective bits of the accumulator ACC are inverted and the resulting complement to "15" is introduced into ACC.

(12) LDI

The operand $I_4$ enters into the accumulator ACC.

(13) L

The contents of the memory RAM are sent to the accumulator ACC and the operand $I_4$ to the file address counter BM.

(14) LI

The contents of the memory RAM are sent to the accumulator ACC and the operand $I_4$ to the memory file address counter BM. At this time the memory digit address counter BL is incremented. If the contents of BL agree with the preselected value $n_1$, then a next program step is skipped.

(15) XD

The contents of the memory RAM are exchanged with the contents of ACC and the operand $I_4$ is sent to the memory file address counter BM. The memory digit address counter BL is decremented. In the event that the contents of BL agree with the preselected value $n_2$, then a next program step is skipped.

(16) X

The contents of the memory RAM are exchanged with the contents of the accumulator ACC and the operand $I_4$ is loaded into the memory file address counter BM.

(17) XI

The contents of the memory RAM are exchanged with the contents of the accumulator ACC and the operand $I_4$ is sent to the memroy file address counter BM. The memory digit address counter BL is incremented. In the event that BL is equal to the preselected value $n_1$, a next program step is skipped.

(18) XD

The contents of the memory RAM replaces the contents of the accumulator ACC, the operand $I_4$ being sent to the memory file address counter BM. The memory digit address counter BL at this time is incremented. If the contents of BL are equal to $n_2$, then a next program step is skipped.

(19) LBLI

The operand $I_4$ is loaded into the memory digit address counter BL.

(20) LB

The operand $I_4$ is loaded into the memory file address counter BM and the operand B to the memory digit address counter BL.

(21) ABLI

The operand $I_4$ is added to the contents of the memory digit address counter BL in a binary addition fashion, the results being loaded back to BL. If the contents of BL are equal to $n_1$, then no next program step is carried out.

(22) ABMI

The operand $I_4$ is added to the contents of the memory file address counter BM in a binary fashion, the results being into BM.

(23) T

The operand $I_4$ is loaded into the program step counter PL.

(24) SKC

If the carry flip flop C is "1", then no next program step is taken. (25) SKM

The contents of the operand $I_4$ are decoded and a next program step is skipped as long as a specific bit position of the memory specified by the operand $I_4$ assumes "1".

(26) SKBI

The contents of the memory digit address counter BL are compared with the operand $I_4$ and a next succeeding program step is skipped when there is agreement.

(27) SKAI

The contents of the accumulator ACC are compared with the operand $I_4$ and if both are equal to each other a next program step is skipped.

(28) SKAM

The contents of the accumulator ACC are compared with the contents of the RAM and if both are equal a next program step is skipped.

(29) $SKN_1$

When the input $KN_1$ is "0", a next program step is skipped.

(30) $SKN_2$

When the input $KN_2$ is "0", a next program step is skipped.

(31) $SKF_1$

When the input $KF_1$ is "0", a next program step is skipped.

(32) $SKF_2$

When the input $KF_2$ is "0", a next program step is skipped.

(33) SKAK

When the input AK is "1", a next program step is skipped.

(34) SKTAB

When the input TAB is "1", a next program step is skipped.

(35) SKFA

When the flag flip flop F/A assumes "1" a next program step is skipped.

(36) SKFB

When the flag flip flop $F_B$ assumes "1", a next program step is skipped.

(37) WIS

The contents of the output buffer register W are one bit right shifted, the first bit position (the most significant bit position) receiving "1".

(38) WIR

The contents of the output buffer register W are one bit right shifted, the first bit position (the most significant bit position being loaded with "0".

(39) NPS

The output control F/F $N_P$ for the buffer register W is set ("1" enters).

(40) NPR

The buffer register output control flip flop $N_P$ is reset ("0" enters therein).

(41) ATF

The contents of the accumulator ACC are transferred into the output buffer register F.

(42) LXA

The contents of the accumulator ACC are unloaded into the temporary register X.

(43) XAX

The contents of the accumulator ACC are exchanged with the contents of the temporary register X.

(44) SFA

The flag F/F FA is set (an input of "1").

(45) RFA

The flag F/F FA is reset (an input of "0").

(46) SFB

The flag flip flop $F_B$ is set (an input of "1").

(47) RFB

The flag flip flop $F_B$ is reset (an input of "0").

(48) SFC

An input testing flag F/F $F_C$ is set (an input of "1").

(49) RFC

The input testing flag F/F $F_C$ is reset (an input of "0").

(50) SKB

When an input β is "1", a next program step is skipped.

(51) KTA

The inputs $k_1$–$k_4$ are introduced into the accumulator ACC.

(52) STPO

The contents of the accumulator ACC are sent to the stack register SA and the contents of the temporary register X to the stack register SX.

(53) EXPO

The contents of the accumulator ACC are exchanged with the stack register SA and the contents of the temporary register X with the stack register SX.

(54) TML

The contents of the program counter $P_L$ incremented by one are transferred into the program stack register SP and the operand $I_A$ into the program counter $P_L$.

(55) RIT

The contents of the program stack register SP are transmitted into the program counter $P_L$.

Table 2 sets forth the relationship between the operation codes contained within the ROM of the CPU structure and the operand.

TABLE 2

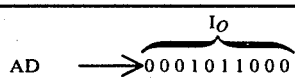

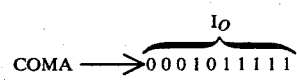

TABLE 2-continued

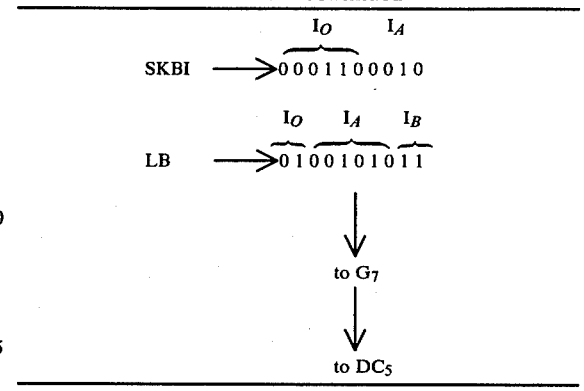

wherein $I_O$: the operation codes and $I_A$, $I_B$: the operands

Taking an example wherein the output of the read only memory ROM is 10 bit long, the instructoin decoder $DC_5$ decides whether the instruction AD or COMA (see Table 1) assumes "0001011000" or "0001011111" and develops the control instructions ㉓, ㉖, or ㉗. SKBI is identified by the fact that the upper six bits assume "000110", the lower 4 bits "0010" being treated as the operand $I_A$ and the remaining ninth and tenth bits "11" as the operand $I_B$. The operand forms part of instruction words and specifies data and addresses for next succeeding instructions and can be called an address area of an instruction.

Major processing operaitons (a processing list) of the CPU structure will now be described in sufficient detail.

[PROCESSING LIST]

(I) A same numeral N is loaded into a specific region of the memory RAM (NNN→X)

(II) A predetermined number of different numerals are loaded into a specific region of the memory ($N_1$, $N_2$, $N_3$, ... →X)

(III) The contents of a specific region of the memory are transferred into a different region of the memory (X→Y)

(IV) The contents of a specific region of the memory are exchanged with that of a different region (X⟵⟶Y)

(V) A given numeral N is added or subtracted in a binary fashion from the contents of a specific region of the memory (X±N)

(VI) The contents of a specific region of the memory are added in a decimal fashion to the contents of a different region (X±Y)

(VII) The contents of a specific region of the memory are one digit shifted (X right, X left)

(VIII) A one bit conditional F/F associated with a specific region of the memory is set or reset (F set, F reset)

(IX) The state of the one bit conditional F/F associated with a specific region of the memory is sensed and a next succeeding program address is changed according to the results of the state detection.

(X) It is decided whether the digit contents of a specific region of the memory reach a preselected numeral and a next succeeding program step is altered according to the results of such decision.

(XI) It is decided whether the plural digit contents of a specific region of the memory are equal to a preselected numeral and a program step is altered according to the results of the decision.

(XII) It is decided whether the digit contents of a specific region of the memory are smaller than a given value and a program step to be next executed is changed according to the decision.

(XIII) It is decided whether the contents of a specific region of the memory are greater than a given value and the results of such decision alter a program step to be next executed.

(XIV) The contents of a specific region of the memory are displayed.

(XV) What kind of a key switch is actuated is decided.

The above processing events in (1)–(15) above are executed according to the instruction codes step by step in the following manner.

(I) PROCEDURE OF LOADING A SAME VALUE N INTO A SPECIFIC REGION OF THE MEMORY (NNN→X)

(Type 1)

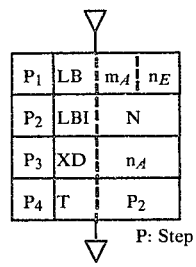

P: Step $P_1$: The first digit position of the memory to be processed is specified by a file address $m_A$ and a digit address $n_E$.

$P_2$: The value N is loaded into ACC.

$P_3$: The value N is loaded into the specified region of the memory by exchange between the memory and ACC. With no change in the file address of the memory, $m_A$ is specified and the digit address is decremented to determine a digit to be next introduced. By determining $n_2$ as the final digit value $n_A$ to be introduced, the next step $P_4$ is skipped to complete the processing of the Type 1 since BL=$n_2$ under the condition that the value N has been completely loaded into the specific region.

$P_4$: LDI and XD are carried out repeatedly from the program address $P_2$ up to BL=V.

(Type 2)

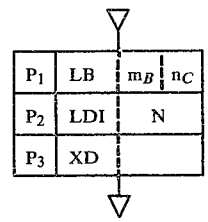

$P_1$: The digit of the memory to be processed is determined by the file address $m_B$ and the digit address $n_C$.

$P_2$: The ACC is loaded with the value N.

$P_3$: By exchange between the memory and ACC the value N is loaded into the above specified region of the memory. This completes the processing of Type 2. An operand area of $X_D$ is necessary to the next succeeding process and not to this step.

(Type 3)

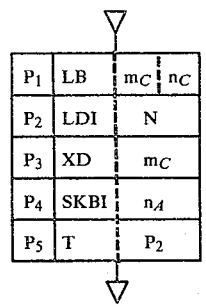

$P_1$: The first digit of the memory to be processed is specified by the file address $m_C$ and the digit address $n_O$.

$P_2$: The ACC is loaded with the value N.

$P_3$: By exchange between the memory and ACC the value N is loaded into that specified region of the memory. With no change in the file address of the memory $m_C$ is specified and the digit address is decremented in order to determine the digit to be next loaded therein.

$P_4$: It is decided whether the digit processed during the step $P_3$ is the final digit $n_B$. If it is $n_B$, then the digit address is decremented to $n_A$. An operand area of the SKI instruction is occupied by $n_A$, thus loading the final digit with the value N. In reaching $P_4$, conditions are fulfilled and the next step $P_5$ is skipped, thereby terminating the type 3. If the conditions are not fulfilled, $P_5$ is then reached.

$P_5$: The program address $P_2$ is specified and $P_2$–$P_4$ are repeated until BL=$n_A$.

(II) PROCEDURE OF LOADING A PREDETERMINED NUMBER OF DIFFERENT VALUES INTO A SPECIFIC REGION OF THE MEMORY ($N_1$, $N_2$, $N_3$, ... →X)

(Type 1)

For example, four digit values $N_4N_3N_2N_1$ are loaded an arbitraray digit position in the same manner as above.

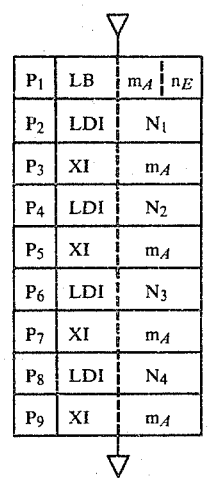

P$_1$: The first processed digit position of the memory is specified by the file address m$_A$ and the digit address n$_E$.

P$_2$: A constant N$_1$ is loaded into ACC.

P$_3$: Through exchange between the memory and the ACC the value N$_1$ is loaded into the above specified region of the memory. The file address of the memory remains unchanged as m$_A$, whereas the digit address is up for introduction of the next digit.

P$_4$: A second constnat N$_2$ is loaded into ACC.

P$_5$: Since the second digit of the memory has been specified during P$_3$, the second constant N$_2$ is loaded into the second digit position of the memory through exchange between the memory and ACC.

P$_6$–P$_9$: The same as in the above paragraph.

(Type 2)

Any value of 0–15 is loaded into a predetermined register.

(Type 2)

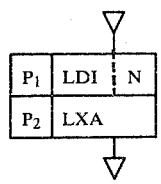

P$_1$: The value N is loaded into ACC.

P$_2$: The value N is transmitted from ACC into the register X.

(III) PROCEDURE OF TRANSFERRING THE CONTENTS OF A SPECIFIC REGION OF THE MEMORY TO A DIFFERENT REGION OF THE MEMORY (X→Y)

(Type 1)

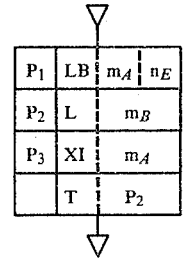

P$_1$: The first memory file address is specified as m$_A$ and the first digit address as n$_E$.

P$_2$: The contents of the first digit position of the memory are loaded into ACC and its designation, the second memory file address is specified as m$_B$ prior to the transmission step P$_3$.

P$_3$: The first digit memory contents loaded into the ACC are replaced by the same second memory digit contents so that the first memory contents are transmitted into the second memory. In order to repeat the above process, the first memory file address m$_A$ is again set. The value of the final digit n$_A$ to be transmitted is previously selected to be n$_1$. Since BL→n$_1$ after the overall first memory contents have been sent to the second memory, the next step P$_4$ is skipped to complete the processing of Type 1. The digit address is progressively incremented until BL=V (the final digit). Through the step P$_4$ the file address is set up at m$_A$ to lead back to P$_2$, thereby specifying the first memory.

P$_4$: The program address is set at the step P$_2$ and the instructions P$_2$ and P$_3$ are repeatedly executed until BL=n$_1$. The transmission step is advanced digit by digit.

(Type 2)

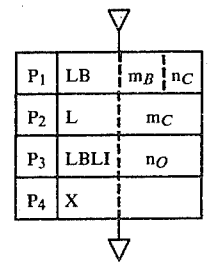

P$_1$: The region of the memory to be processed is determined by the file address m$_A$ and the digit address n$_C$.

P$_2$: The contents of the memory as specified above are unloaded into ACC and the memory file address is set at m$_C$ prior to the next transmission step P$_4$.

P$_3$: The digit address of the memory, the destination for the transmission process, is specified as m$_C$. The destinated region of the memory is specified via the steps P2 and P3.

P4: The contents of ACC are exchanged with the contents of the regions of the memory specified bu P2 and P3. The operand of X has no connection with the present process.

(Type 3)

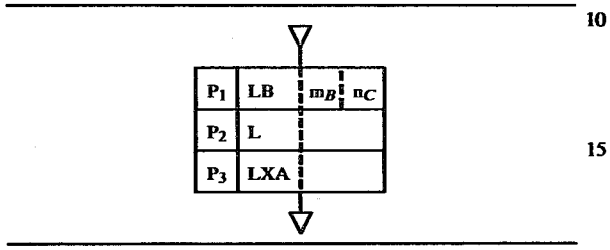

P1: The region of the memory to be processed is identified by the file address $m_A$ and the digit address $n_C$.

P2: The contents of the memory region specified during P1 are unloaded into ACC.

P3: The contents of the memory transmitted from ACC are sent to the register X, completing the type 3 processing.

(IV) PROCEDURE OF EXCHANGING CONTENTS BETWEEN A SPECIFIC REGION OF THE MEMORY AND A DIFFERENT REGION (X→Y)

(Type 1)

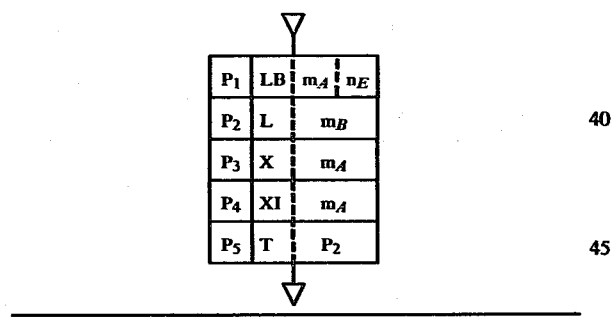

P1: The first memory file address to be processed is specified as $m_A$ and the first digit address as $n_E$.

P2: The specific digit contents of the first memory are loaded into ACC and the second memory file address is specified as $m_B$ for preparation of the next step.

P3: The specific digit contents of the first memory contained within ACC are exchanged with the same digit contents of the second memory specified by P2. The file address of the first memory is specified as $m_A$ in order to load the contents of the memory now in ACC into the first memory.

P4: The contents of the second memory now in ACC are exchanged with the contents of the first memory at the corresponding digit positions so that the contents of the second memory are transferred to the first memory. Exchanges are carried out during the steps P2-P4. The first memory is specified on by the file address $m_A$, while the digit address is incremented to select a next address. Exchange is carried out progressively digit by digit. The final digit value $n_A$ is previously set at $n_1$ such that $B_L=n_1$ after the exchange operation between the first memory and the second has been effected throughout the all digit positions, thus skipping the next step P5 and completing the processing of Type 1.

P5: The program address P2 is selected and the instructions for P2 to P4 are executed repeatedly until $B_L=n_1$. The exchange operation is advanced digit by digit.

(Type 2)

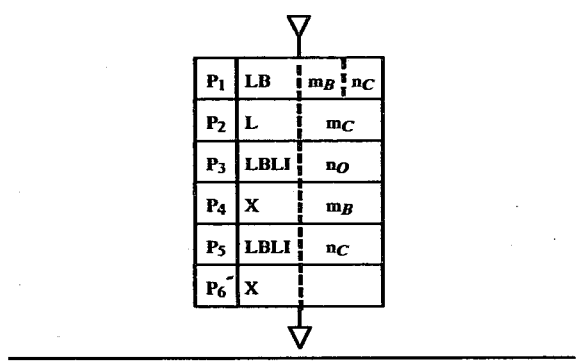

P1: The file address of the first memory to be processed is specified as $m_A$ and the digit address as $n_C$.

P2: The contents of the specific digit position of the first memory are unloaded into ACC and the file address of the second memory is specified as $m_C$ and ready to exchange.

P3: The digit address of the second memory, the destination for the exchange process, is specified as $n_O$ to determine the destinated memory address.

P4: The contents of the first memory now within ACC are exchanged with that of the second memory. At the same time the file address $m_B$ of the first memory is again specified to transfer the contents of the first memory to the first memory.

P5: The digit address $n_C$ of the first memory is specified to determine the destination address of the first memory.

P6: The contents of the second memory now within ACC are exchanged with the contents of the first memory.

(Type 3)

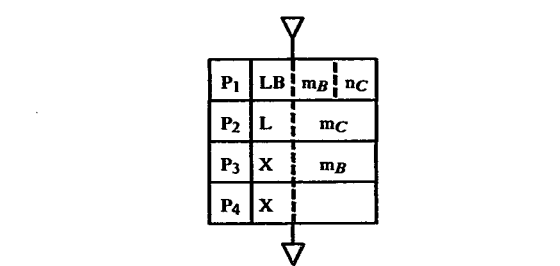

P1: The file address $m_A$ of the first memory to be processed is specified and the digit address $n_C$ is specified.

P₂: The contents of the first memory are loaded into ACC and the file address $m_C$ of the second memory is selected.

P₃: The exchange is carried out between the first and second memory so that the contents of the first memory are loaded into the second memory. Prior to the step P₄ the file address $m_B$ of the first memory is selected again.

P₄: The exchange is effected between the contents of the second memory and the first memory.

(Type 4)

| P₁ | LB  | $m_B$ | $m_C$ |
|----|-----|-------|-------|
| P₂ | L   | $m_B$ |       |
| P₃ | XAX |       |       |
| P₄ | X   |       |       |

P₁: The region of the memory to be processed is specified by the file address $m_A$ and the digit address $n_C$.

P₂: The contents of the memory region specified in P₁ above are loaded into ACC. The file address $m_B$ is kept being selected prior to the exchange with the contents of the register X.

P₃: The exchange is effected between ACC and the register X so that the contents of the memory are shifted to the register X.

P₄: Through the exchange between ACC containing the contents of the register X and the memory, the contents of the register X are substantially transferred into the memory, thus accomplishing the Type 4 processing.

(V) PROCEDURE OF EFFECTING A BINARY ADDITION OR SUBTRACTION OF A GIVEN VALUE N ONTO A SPECIFIC REGION OF THE MEMORY (Type 1)

$M_1 + N \rightarrow M$

| P₁ | LB  | $m_B$ | $n_C$ |
|----|-----|-------|-------|
| P₂ | L   | $m_B$ |       |
| P₃ | ADI | N     |       |
| P₄ | X   |       |       |

P₁: The region of the memory to be processed is specified by the file address $m_B$ and the digit address $n_C$.

P₂: The contents of the memory specified by the step P₁ are unloaded into ACC. The memory file address is set again at $m_B$ to specify the same memory.

P₃: The operand specifies the value N to be added and the contents of the memory contained within ACC are added with the value N, the results being loaded back to ACC.

P₄: The sum contained with ACC is exchanged with the contents of the memory specified by the step P₂, thus completing the Type 1 processing.

(Type 2)

$X + N \rightarrow X$

| P₁ | XAX |   |
|----|-----|---|
| P₂ | ADI | N |
| P₃ | XAX |   |

P₁: The exchange is effected between the register X and ACC.

P₂: The operand specifies the avlue N to be added and an addition is carried out on the contents of the register X now within ACC and the value N, with the results back to ACC.

P₃: Through the exchange between the resulting sum within ACC and the contents of the register X, the processing of Type 2 ($X + N \rightarrow X$) is performed.

(Type 3)

$M_1 + N \rightarrow M_2$

| P₁ | LB  | $m_B$ | $n_C$ |
|----|-----|-------|-------|
| P₂ | L   | $m_C$ |       |
| P₃ | ADI | N     |       |
| P₄ | X   |       |       |

P₁: The region of the first memory to be processed is decided by the file address $m_B$ and the digit address $n_C$.

P₂: The contents of the memory specified by P₁ are loaded into ACC. The file address $m_C$ of the second memory is specified to return addition results to the second memory.

P₃: The operand specifies the value N to be added and the value N is added to the contents of the memory now within ACC, with the results being loaded into ACC.

P₄: The resulting sum within ACC is exchanged with the contents of the second memory as specified by P₂, thus completing the processing of Type 3.

(Type 4)

$M_1 - N \rightarrow M_1$

| P₁ | LB | | $m_B$ | $n_C$ |
|----|----|--|-------|-------|
| P₂ | SC | | | |
| P₃ | LDI | | N | |
| P₄ | COMA | | | |
| P₅ | ADC | | | |
| P₆ | X | | | |

$P_1$: There are specified the file address $m_B$ and the digit address $n_C$ of the memory to be processed.

$P_2$: Subtraction is carried out in such a way that the complement of a subtrahend is added to a minuend and the F/F C remains set because of the absence of a borrow from a lower digit position.

$P_3$: ACC is loaded with the subtrahend N.

$P_4$: The complement of the subtrahend to "15" is evaluated and loaded into ACC.

$P_5$: In the event that any borrow occurs during the subtraction, the complement of the subtrahend to "16" is added to the minuend. If a borrow free state is denoted as C=1, then a straight binary subtraction of $\overline{ACC}+C+M \rightarrow ACC$ is effected.

$P_6$: The resulting difference during $P_5$ is returned to the same memory through the exchange between ACC and that memory.

(Type 5)

$M_1 - N \rightarrow M_2$

| P₁ | LB | | $m_B$ | $n_C$ |
|----|----|--|-------|-------|
| P₂ | SC | | | |
| P₃ | LDI | | N | |
| P₄ | COMA | | | |
| P₅ | ADC | | | |
| P₆ | LB | | $m_C$ | $n_C$ |
| P₇ | X | | | | same as Type 4

$P_6$: To load the resulting difference during $P_5$ into the second memory, the file address $m_C$ and the digit address $n_C$ of the second memory are selected.

$P_7$: Through exchange the resulting difference is transferred from ACC into the second memory as specified by the step $P_6$.

(Type 6)

| P₁ | LB | | $m_B$ | $n_C$ |
|----|----|--|-------|-------|
| P₂ | SC | | | |
| P₃ | LDI | | N | |
| P₄ | COMA | | | |
| P₅ | X | | $m_B$ | |
| P₆ | XAX | | | |
| P₇ | ADC | | | |
| P₈ | EXAX | | | |

$P_1$: The file address $m_B$ and the digit address $n_C$ of the memory ready for the step $P_5$ are selected.

$P_2$: Subtraction is carried out in the manner of adding the complement of a subtrahend to a minuend and the F/F C remains set because of the absence of a borrow from a lower digit position.

$P_3$: ACC is loaded with the subtrahend N.

$P_4$: The complement of the subtrahend to "15" is evaluated and loaded into ACC.

$P_5$: To accomplish calculations with the contents of the register X, the memory as specified by $P_1$ is loaded with the contents of ACC.

$P_6$: The contents of the register X are transmitted into ACC through the exchange process. After this step the memory contains the complement of the subtrahend to "15" and ACC contains the contents of X.

$P_7$: ACC+M+C corresponds to X-N and the results of a binary subtraction are loaded into ACC.

$P_8$: The contents of ACC are exchanged with the contents of X and the value of X-N is transmitted into X, thereby completing the processing of Type 6.

(Type 7)

$N - M_1 \rightarrow M_1$

| P₁ | LB | | $m_B$ | $n_C$ |
|----|----|--|-------|-------|
| P₂ | SC | | | |
| P₃ | LDI | | N | |
| P₄ | X | | $m_B$ | |
| P₅ | COMA | | | |
| P₆ | ADC | | | |
| P₇ | X | | | |

P$_1$: The file address m$_B$ and the digit address n$_C$ of the memory to be processed are selected.

P$_2$: One-digit subtraction is effected in the manner of adding the complement of a subtrahend to a minuend, in which case F/F C remains set.

P$_3$: ACC is loaded with a minuend.

P$_4$: The exchange is effected between the memory (the subtrahend) and ACC and the memory file address remains as m$_B$ for preparation of P$_7$.

P$_5$: The complement of a subtrahend in ACC to "15" is evaluated and loaded into ACC.

P$_6$: In the event that there is no borrow from a lower digit position, the complement of a subtrahend to "16" is added to a minuend. If a borrowless state is denoted as $\overline{C} = 1$, then N-M is substantially executed by $\overline{ACC} + \overline{C} + M$, the resulting difference being loaded into ACC.

P$_7$: Since the memory file address remains unchanged during P$_4$, the difference is unloaded from ACC back to the memory, thus completing the proceesing of Type 7.

(Type 8)

N − M$_1$ → M$_2$

| P$_1$ | LB | m$_B$ | n$_C$ |
| --- | --- | --- | --- |
| P$_2$ | L | | m$_C$ |
| P$_3$ | COMA | | |
| P$_4$ | ADI | | N + 1 |
| P$_5$ | X | | |

P$_1$: The file address m$_B$ and the digit address n$_C$ of the memory to be processed are selected.

P$_2$: The contents specified by the step P$_1$ and corresponding to a subtrahend are loaded into ACC. The file address m$_C$ of the second memory is specified for preparation of a step P$_5$.

P$_3$: The complement of the subtrahend to "15" is evaluated and loaded into ACC.

P$_4$: The operand is made a minuend plug "1". This subtraction is one digit long and accomplished by adding the complement of the subtrahend to the minuend. A conventional complementary addition is defined as $\overline{ACC} + \overline{C} + M$ as in the Type 7 processing in the absence of a borrow as defined by $\overline{C} = 1$. Since the ADI instruction carries C, ACC+1 is processed in advance. This completes the processing of Type 8 of N−M, the results being stored within ACC.

P$_5$: The difference obtained from the step P$_4$ is transmitted into the second memory specified by P$_2$.

(Type 9)

M ± 1 → M

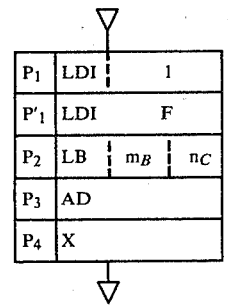

P$_1$: (When M+1) ACC is loaded with a binary number "0001" (=1).

P$_1'$: (When M−1) ACC is loaded with a binary number "1111" (=15).

P$_2$: The file address m$_B$ and the digit address n$_C$ of the memory to be processed are selected.

P$_3$: The contents of the memory specified by P$_2$ are added to the contents contained within ACC during P$_1$ or P$_1'$, the sum thereof being loaded into ACC. In the case of P$_1$ ACC+1 and in the case of P$_1'$ ACC−1.

P$_4$: The results are unloaded from ACC to the original memory position, thus completing the processing fashion of Type 9.

(VI) PROCEDURE OF EFFECTING A DECIMAL ADDITION OR SUBTRACTION BETWEEN A SPECIFIC REGION OF THE MEMORY AND A DIFFERENT REGION (Type 1)

X + W → X

| P$_1$ | LB | m$_A$ | n$_E$ |
| --- | --- | --- | --- |
| P$_2$ | RC | | |
| P$_3$ | L | | m$_B$ |
| P$_4$ | ADI | | 6 |
| P$_5$ | ADCSK | | |
| P$_6$ | DC | | |
| P$_7$ | XI | | m$_A$ |
| P$_8$ | T | | P$_3$ |

P$_1$: The first digit position of the first memory to be processed is identified by the file address m$_A$ and the digit address n$_E$.

P$_2$: The carry F/F C is reset because of a carry from a lower digit position in effecting a first digit addition.

P$_3$: The contents of the specific digit position of the first memory are loaded into ACC and the file address m$_B$ of the second memory is selected in advance of additions with the contents of the second memory during P$_4$.

P4: "6" is added to the contents of the specific digit position of the first memory now loaded into ACC for the next succeeding step P5 wherein a decimal carry is sensed during addition.

P5: ACC already receives the contents of the first memory compensated with "6" and a stright binary addition is effected upon the contents of ACC and the contents of the second memory at the corresponding digit positions, the results being loaded back to ACC. In the event a carry is developed during the binary addition at the fourth bit position, P7 is reached without passing P6. The presence of the carry during the fourth bit addition implies the development of a decimal carry.

P6: In the event the decimal carry failed to develop during the addition P5, "6" for the process P4 is overruded. An addition of "10" is same as a subtraction of "6".

P7: The one-digit decimal sum is unloaded from ACC into the second memory and the digit address is incremented for a next digit addition and the file address $m_A$ of the first memory is selected. The final digit to be added is previously set at $n_1$. Since $BL=n_1$ after the overall digit addition is effected upon the first and second memory, the next succeeding step P8 is skipped to thereby complete the processing of Type 1.

P8: The program address P3 is selected and the instructions P3-P7 are repeatedly executed until $BL=n_1$. A decimal addition is effected digit by digit.

(Type 2)

X−W→X

| P1 | LB | $m_A$ | $n_E$ |
|----|------|-------|-------|
| P2 | SC | | |
| P3 | L | | $m_B$ |
| P4 | COMA | | |
| P5 | ADCSK | | |
| P6 | DC | | |
| P7 | XI | | $m_A$ |
| P8 | T | | P3 |

P1: The first digit position of the first memory to be processed is specified by the file address $m_A$ and the digit address $n_E$.

P2: Subtraction is performed in the manner of adding the complement of a subtrahend to a minuend and F/F C is set because of the absence of a borrow from a lower digit position during the first digit subtraction.

P3: The contents of the specific digits in the first memory, the subtrahend, are loaded into ACC and the file address $m_B$ of the second memory is specified in advance of the step P7 with the second memory.

P4: The complement of the subtrahend to "15" is evaluated and loaded into ACC.

P5: In the event that there is no borrow from a lower digit place, the complemnt of the subtrahend is added to the minuend to perform a subtraction. On the contrary, in the presence of a borrow, the complement of the subtrahend is added to the minuend. If a borrowless state is denoted as C=1, then a binary addition of $\overline{ACC}+C+M\rightarrow ACC$ is effected. The development of a carry, as a consequence of the execution of the ADSCK instruction, implies failure to give rise to a borrow and leads to the step P7 without the intervention of the step P6. Under these circumstances the addition is executed with the second memory, thus executing substantially subtraction between the first and second memories.

P6: In the case where no carry is developed during the execution of the ADCSK instruction by the step P5, the calculation results are of the sexadecimal notation and thus converted into a decimal code by subtraction of "6" (equal to addition of "10").

P7: The resulting difference between the first and second memories is transmitted from ACC into the second memory. The digit address is incremented and the file address $m_A$ of the first memory is specified in advance of a next succeeding digit subtraction. The final digit to be subtracted is previously determined as $n_1$. Since $BL=n_1$ after the overalldigit subtraction has been completed, the next step P8 is skipped to thereby conclude the processing of Type 2.

P8: After selection of the program address P3 the instructions P3-P7 are repeatedly executed until $BL=n_1$. The decimal subtraction is advanced digit by digit.

(VII) PROCEDURE OF SHIFTING ONE DIGIT THE CONTENTS OF A SPECIFIC REGION OF THE MEMORY (Type 1)

Right Shift

| P1 | LB | $m_A$ | $n_A$ |
|----|-----|-------|-------|
| P2 | LDI | 0 | |
| P3 | XD | $m_A$ | |
| P4 | T | P3 | |

P1: The file address $m_A$ and the digit address $n_A$ of the memory to be processed are determined.

P2: ACC is loaded with "0" and ready to introduce "0" into the most significant digit position when the right shift operation is effected.

P3: The exchange is carried out between XCC and the memory and the digit address is decremented to specific a one digit lower position. The memory address is still at $m_A$. XD is repeated executed through P4 and P3. By the step ACC⇌M "0" is transmitted from ACC to the most significant digit position of the memory which in turn provides its original contents for ACC. When the digit address is down via B and XD is about to be executed at P₃ via P₄, the second most significant digit is selected to contain the original content of the most significant digit position which has previously been contained within ACC. At this time ACC is allowed to contain the contents of the second most significant digit position. The least significant digit is previously selected as n₂. If the transmission step reaches the least significant digit position BL=n₂ is satisfied and P₄ is skipped. In other words, the digit contents are shifted down to thereby conclude the processing of Type 1.

P₄: XD is repeated at P₃ until BL=V.

(Type 2)

Left Shift

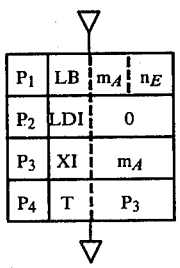

P₁: The file address $m_A$ and the least significant digit $n_E$ of the memory to be processed are determined.

P₂: ACC is loaded with "0" and ready to introduce "0" into the least significant digit position when the left shift operation is started.

P₃: The exchange is carried out between ACC and the memory and the digit address is incremented to specify a one digit upper position. The memory address is still at $m_A$. XD is repeated executed through P₄ and P₃. By the step ACC→M, "0" is transmitted from ACC to the least significant digit position of the memory which in turn provides its original contents for ACC. When the digit address is up via P₃ and XD is about to be executed at P₃ via P₄, the second least significant digit is selected to contain the original content of the least significant digit position which has previously been contained within ACC. At this time ACC is allowed to contain the contents of the second least significant digit position. The most significant digit is previously selected as n₁. If the transmission step reaches the most significant digit position, BL=n₁ is satisfied and P₄ is skipped. In other words, the digit contents are shifted up to thereby conclude the processing of Type 2.

P₄: XI is repeated at P₃ until BL=V.

(VIII) PROCEDURE OF SETTING OR RESETTING A ONE-BIT CONDITION F/F ASSOCIATED WITH A SPECIFIC REGION OF THE MEMORY (Type 1)

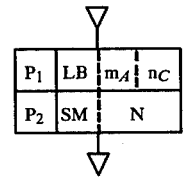

P₁: The file address $m_B$ and the digit address $n_C$ of a region of the memory to be processed are determined.

P₂: "1" is loaded into a desired bit N within the digit position of the memory specified by P₁, thus concluding the processing of Type 1.

(Type 2)

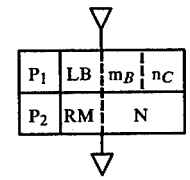

P₁: The file address $m_B$ and the digit address $n_C$ of a region of the memory to be processed are determined.

P₂: "0" is loaded into a desired bit N within the digit position of the memory specified by P₁, thus concluding the processing of Type 2.

(IX) PROCEDURE OF SENSING THE STATE OF THE ONE-BIT CONDITIONAL F/F ASSOCIATED WITH A SPECIFIC REGION OF THE MEMORY AND CHANGING A NEXT PROGRAM ADDRESS (STEP) AS A RESULT OF THE SENSING OPERATION

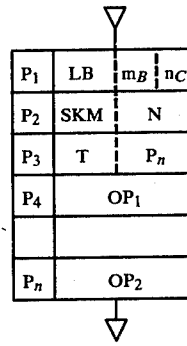

P₁: There are specified the file address $m_B$ and the digit address $n_C$ where a desired one-bit conditional F/F is present.

P₂: In the case where the contents of the bit position (corresponding to the conditional F/F) specified by N within the memory region as selected during P₁ assume "1", the step proceeds to P₄ with skipping P₃, thus executing the operation OP₁. In the event that the desired bit position bears "0", the next step P₃ is skipped.

P₃: When the foregoing P₂ has been concluded as the conditional F/F in the "0" state, the program step P$_n$ is selected in order to execute the operation OP₂.

(X) PROCEDURE OF DECIDING WHETHER THE DIGIT CONTENTS OF A SPECIFIC REGION OF THE MEMORY REACH A PRESELECTED NUMERAL AND ALTERING A NEXT PROGRAM ADDRESS (STEP) ACCORDING TO THE RESULTS OF THE DECISION

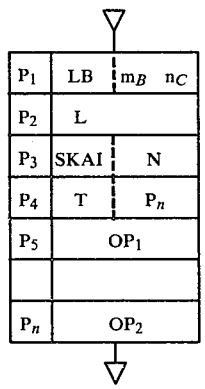

P₁: The region of the memory which contains contents to be decided is identified by the file address m$_B$ and the digit address n$_C$.

P₂: The contents of the memory as identified during P₁ are unloaded into ACC.

P₃: The contents of ACC are compared with the preselected value N and if there is agreement the step advances toward P₅ without executing P₄ to perform the operation OP₁. P₄ is however reached if the contents of ACC are not equal to N.

P₄: The program address (step) P$_n$ is then selected to perform the operation OP₂.

(XI) PROCEDURE OF DECIDING WHETHER THE PLURAL DIGIT CONTENTS OF A SPECIFIC REGION OF THE MEMORY ARE EQUAL TO A PRESELECTED NUMERAL AND ALTERING A PROGRAM STEP ACCORDING TO THE RESULTS OF THE DECISION

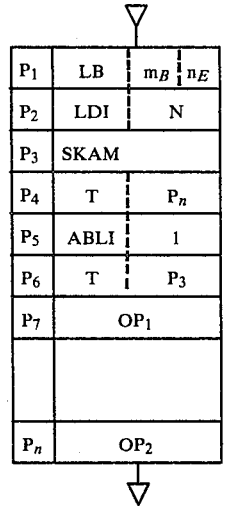

P₁: The region of the memory to be judged is identified by the file address m$_B$ and the first digit address n$_E$.

P₂: The value N is loaded into ACC for comparison.

P₃: The value V within ACC is compared with the digit contents of the specific region of the memory and if there is agreement P₅ is reached without passing P₄ to advance the comparison operation toward the next succeeding digit. P₄ is selected in a non-agreement.

P₄: In the case of a non-agreement during P₃ the program address (step) P$_n$ is specified to execute the operation forthwith.

P₅: The digit address is incremented by adding "1" thereto. This step is aimed at evaluating in sequence a plurality of digits within the memory. The ultimate digit to be evaluated is previously determined as (V). The comparison is repeated throughout the desired digit positions. If a non-agreement state occurs on the way, the operation OP₂ is accomplished through P₄. In the case where the agreement state goes on till BL=V, there is selected P₇ rather than P₆ to perform the operation OP₁.

P₆: When the agreement state goes on during P₅, P₃ is reverted for evaluation.

(XII) PROCEDURE OF DECIDING WHETHER THE CONTENTS OF A SPECIFIC REGION OF THE MEMORY ARE SMALLER THAN A GIVEN VALUE AND DECIDING WHICH ADDRESS (STEP) IS TO BE EXECUTED

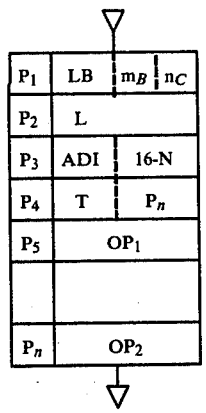

$P_1$: The file address $m_B$ and the digit address $n_C$ of the memory are decided.

$P_2$: The contents of the memory as specified during $P_1$ are unloaded into ACC.

$P_3$: N is the value to be compared with the contents of the memory and the operand area specifies $16-N$ which in turn is added to the contents of ACC, the sum thereof being loaded back to ACC. The occurrence of a fourth bit carry during the addition suggests that the result of the binary addition exceeds 16, that is, $M+(16-N)\geq 16$ and hence $M\geq N$. The step is progressed toward $P_4$.

$P_4$: When $M\geq N$ is denied, the program step $P_n$ is selected to carry out the operation $OP_2$.

(XIII) PROCEDURE OF DECIDING WHETHER THE CONTENTS OF A SPECIFIC REGION OF THE MEMORY ARE GREATER THAN A GIVEN VALUE AND DECIDING WHICH ADDRESS (STEP) IS TO BE EXECUTED

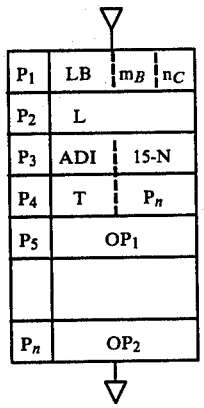

$P_1$: The file address $m_B$ and the digit address $n_C$ of the memory are decided.

$P_2$: The contents of the memory as specified during $P_1$ are unloaded into ACC.

$P_3$: N is the value to be compared with the contents of the memory and the operand area specifies $15-N$ which in turn is added to the contents of ACC, the sum thereof being loaded back to ACC. The occurrence of a fourth bit carry during the addition suggests that the results of binary addition exceeds 16, that is, $M+(15-N)\geq 16$ and hence $M\geq N+1$ and $M>N$. The step is progressed toward $P_5$ with skipping $P_4$, thus performing the operation $OP_1$. In the absence of a carry (namely, $M>N$) the step $P_4$ is reached.

$P_4$: When $M\geq N$ is denied, the program address (Step) $P_n$ is selected to carry out the operation $OP_2$.

(XIV) PROCEDURE OF DISPLAYING THE CONTENTS OF A SPECIFIC REGION OF THE MEMORY (Type 1)

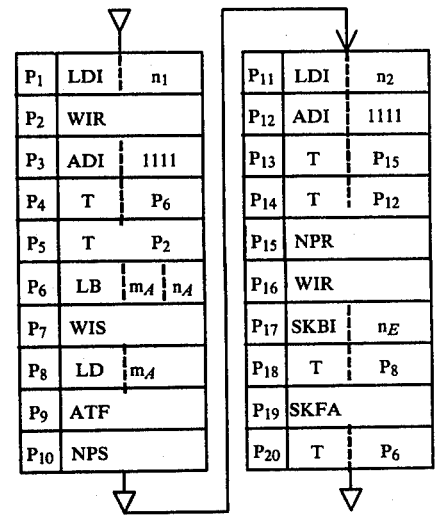

$P_1$: The bit number $n_1$ of the buffer register W is loaded into ACC to reset the overall contents of the buffer register W for generating digit selection signals effective to drive a display panel on a time sharing basis.

$P_2$: After the overall contents of the register W are one bit shifted to the right, its first bit is loaded with "0". This procedure is repeated via $P_4$ until $C_4=1$ during $P_3$, thus resetting the overall contents of W.

$P_3$: The operand $I_A$ is decided as "1111" and $AC+1111$ is effected (this substantially corresponds to $ACC-1$). Since ACC is loaded with $n_1$ during $P_1$, this process is repeated $n_1$ times. When the addition of "1111" is effected following $ACC=0$, the fourth bit carry $C_4$ assumes "0". When this occurs, the step is advanced to $P_4$. Otherwise the step is skipped up to $P_5$.

$P_4$: When the fourth bit carry $C_4=0$ during $ACC+1111$, the overall contents of W are reduced to "0" to thereby complete all the pre-display processes. The first address $P_6$ is set for the memory display steps.

$P_5$: In the event that the fourth bit carry $C_4=1$ during $ACC+1111$, the overall contents of W have not yet reduced to "0". Under these circumstances $P_2$ is reverted to repeat the introduction of "0" into W.

$P_6$: The first digit position of the memory region which contains data to be displayed is identified by the file address $m_A$ and the digit address $n_A$.

$P_7$: After the contents of the register W for generating the digit selection signals are one bit shifted to the right, its first bit position is loaded with "1" and thus ready to supply the digit selection signal to the first digit position of the display.

$P_8$: The contents of the specific region of the memory are unloaded into ACC. The file address of the memory still remains at $m_A$, whereas the digit address is decremented for the next succeeding digit processing.

$P_9$: The contents of the memory is shifted from ACC to the buffer register F. The contents of the register F are supplied to the segment decoder SD to generate segment display signals.

$P_{10}$: To lead out the contents of the register W as display signals, the conditional F/F $N_P$ is supplied with "1" and placed into the set state. As a result of this, the contents of the memory processed during $P_9$ are displayed on the first digit position of the display.

$P_{11}$: A count initial value $n_2$ is loaded into ACC to determine a one digit long display period of time.

$P_{12}$: ACC-1 is carried out like $P_3$. When ACC does not assume "0" (when $C_4 = 1$) the step is skipped up to $P_{14}$.

$P_{13}$: A desired period of display is determined by counting the contents of ACC during $P_{12}$. After the completion of the counting $P_{15}$ is reached from $P_{13}$. The counting period is equal in length to a one-digit display period of time.

$P_{14}$: Before the passage of the desired period of display the step is progressed from $P_{12}$ to $P_{14}$ with skipping $P_{13}$ and jumped back to $P_{12}$. This procedure is repeated.

$P_{15}$: $N_P$ is reset to stop supplying the digit selection signals to the display. Until $N_P$ is set again during $P_{10}$, overlapping display problems are avoided by using the adjacent digit signals.

$P_{16}$: The register W is one bit shifted to the right and its first bit position is loaded with "0". "1" introduced during $P_7$ is one bit shifted down for preparation of the next succeeding digit selection.

$P_{17}$: It is decided whether the ultimate digit of the memory to be displayed has been processed and actually whether the value $n_E$ of the last second digit has been reached because the step $P_8$ of $B_L - 1$ is in effect.

$P_{18}$: In the event that ultimate digit has not yet been reached, $P_8$ is reverted for the next succeeding digit display processing.

$P_{19}$: For example, provided that the completion of the display operation is conditional by the flag F/F FA, FA = 1 allows $P_{20}$ to be skipped, thereby concluding all the displaying steps.

$P_{20}$: If FA = 1 at $P_{19}$, the display steps are reopened from the first display and the step is jumped up to $P_6$.

(Type 2)

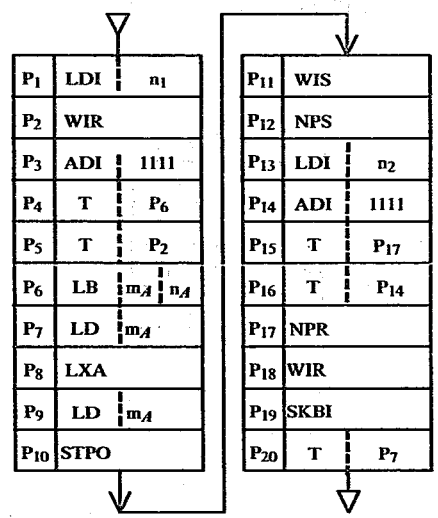

$P_1$: The bit number $n_1$ of the buffer register W is loaded into ACC to reset the overall contents of the buffer register W for generating digit selection signals effective to drive a display panel on a time sharing basis.

$P_2$: After the overall contents of the register W are one bit shifted to the right, its first bit is loaded with "0". This procedure is repeated via $P_4$ until $C_4 = 1$ during $P_3$, thus resetting the overall contents of W.

$P_3$: The operand $I_A$ is decided as "1111" and AC+1111 is effected (this substantially corresponds to ACC−1). Since ACC is loaded with $n_1$ during $P_1$, this process is repeated $n_1$ times. When the addition of "1111" is effected following ACC=0, the fourth bit carry $C_4$ assumes "0". When this occurs, the step is advanced to $P_4$. Otherwise the step is skipped up to $P_5$.

$P_4$: When the fourth bit carry $C_4 = 0$ during ACC+1111, the overall contents of W are reduced to "0" to thereby complete all the pre-display processes. The first address $P_6$ is set for the memory display steps.

$P_5$: In the event that the fourth bit carry $C_4 = 1$ during ACC+1111, the overall contents of W have not yet reduced to "0". Under these circumstances $P_2$ is reverted to repeat the introduction of "0" into W.

$P_6$: The upper four bits of the first digit position of the memory region which contains data to be displayed are identified by the file address $m_A$ and the digit address $m_A$.

$P_7$: The contents of the specific region of the memory are unloaded into ACC. The file address of the memory still remains at $m_A$, whereas the digit address is decremented to specify the lower four bits.

$P_8$: The contents of ACC, the upper four bits, are transmitted into the temporary register X.

$P_9$: The contents of the specific region of the memory are unloaded into ACC. The file address of the memory still remains at $m_A$, whereas the digit address is decremented to specify the upper four bits of the next succeeding digit.

$P_{10}$: The contents of ACC are unloaded into the stack register SA and the contents of the temporary register X into the stack register SX.

$P_{11}$: After the contents of the register W for generating the digit selection signals are one bit shifted to the right, its first bit position is loaded with "1" and thus ready to supply the digit selection signal to the first digit position of the display.

$P_{12}$: To lead out the contents of the register W as display signals, the conditional F/F $N_p$ is supplied with "1" and placed into the set state. As a result of this, the contents of the memory processed during $P_{10}$ are displayed on the first digit position of the display.

$P_{13}$: A count initial value $n_2$ is loaded into ACC to determine a one digit long display period of time.

$P_{14}$: ACC−1 is carried out like $P_3$. When ACC assumes "0" $P_{15}$ is reached and when ACC≠0 (when $C_4=1$) the step is skipped up to $P_{16}$. This procedure is repeated.

$P_{15}$: A desired period of display is determined by counting the contents of ACC during $P_{14}$. After the completion of the counting $P_{17}$ is reached from $P_{15}$. The counting period is equal in length to a one-digit display period of time.

$P_{16}$: Before the passage of the desired period of display the step is progressed from $P_{14}$ to $P_{16}$ with skipping $P_{15}$ and jumped back to $P_{14}$. This procedure is repeated.

$P_{17}$: $N_P$ is reset to stop supplying the digit selection signals to the display. Until $N_P$ is set again during $P_{10}$, overlapping display problems are avoided by using the adjacent digit signals.

$P_{18}$: The register W is one bit shifted to the right and its first bit position is loaded with "0". "1" introduced during $P_7$ is one bit shifted down for preparation of the next succeeding digit selection.

$P_{19}$: It is decided whether the ultimate digit of the memory to be displayed has been processed and actually whether the value $n_E$ of the last second digit has been reached because the step $p_9$ of $B_L-1$ is in effect.

$P_{20}$: In the event that ultimate digit has not yet been reached, $P_7$ is reverted for the next succeeding digit display processing.

(XV) PROCEDURE OF DECIDING WHICH KEY SWITCH IS ACTUATED (SENSING ACTUATION OF ANY KEY DURING DISPLAY)

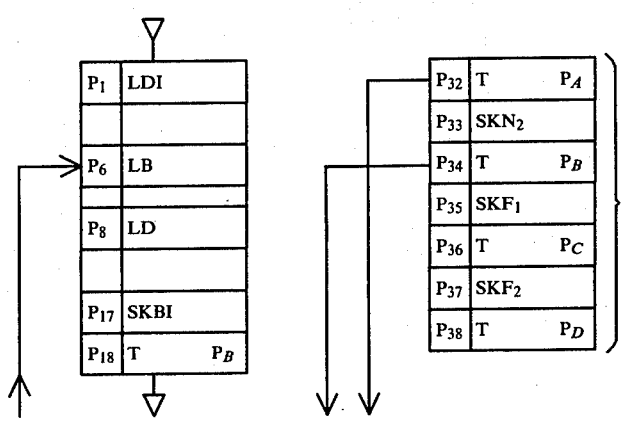

-continued

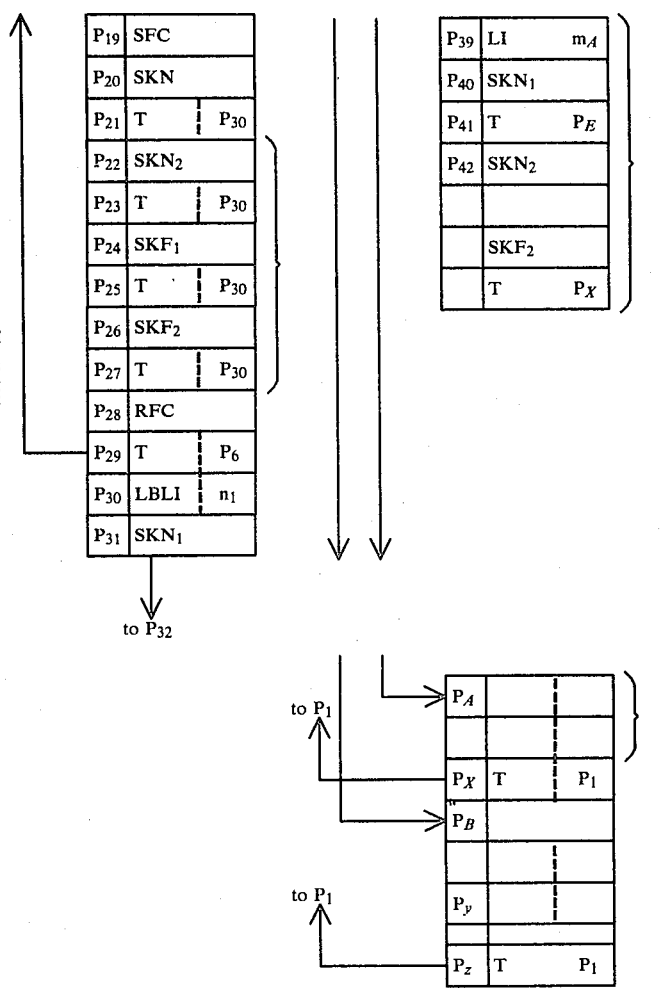

to P₃₂ to P₁ to P₁

P₁–P₁₈: The display processes as discussed in (XIV) above.

P₁₉: After the overall digit contents of the register W are displayed, the flag F/F FC is set to hold all the key signals I₁–Iₙ at a "1" level.

P₂₀: The step is jumped to P₃₀ as long as any one of the keys connected to the key input KN₁ is actuated.

P₂₂–P₂₇: It is decided whether any one of the keys each connected to the respective key inputs KN₂–KF₂ and in the absence of any actuation the step is advanced toward the next succeeding step. To the contrary, the presence of the key actuation leads to P₃₀.

P₂₈: When any key is not actuated, F/F FC is reset to thereby complete the decision as to the key actuations.

P₂₉: The step is jumped up to P₆ to reopen the display routine.

P₃₀: When any key is actually actuated, the memory digit address is set at n₁ to generate the first key strobe signal I₁.

P₃₁: It is decided if the first key storbe signal I₁ is applied to the key input KN₁ and if not the step is advanced toward P₃₃.

P₃₂: When the first key strobe signal I₁ is applied to the key input KN₁, which kind of the keys is actuated is decided. Thereafter, the step is jumped to P_A to provide proper controls according to the key decision. After the completion of the key decision the step is returned directly to P₁ to commence the displaying operation again (P_z is to jump the step to P₁)

P₃₃–P₃₈: It is sequentially decided whether the keys coupled with the first key strobe signal I₁ are actuated. If a specific key is actuated, the step jumps to P_B–P_D for providing appropriate controls for that keys.

P₃₉: This step is executed when no key coupled with the first key strobe signal I₁. This step is to increment the digit address of the memory for the developments of the key strobe signals.

P₄₁ and up: The appropriate key strobe signals are developed and KN₁–KF₂ are sequentially monitored to decide what kind of the keys are actuated. Desired steps are then selected to effects control steps for those actuated keys.

P_A and up: Control steps for the first actuated keys.

P_X: P₁ is returned to reopen the display operation after the control steps for the first key.

The foregoing is the description of the respective major processing events in the CPU architecture.

Figures 4, 5:
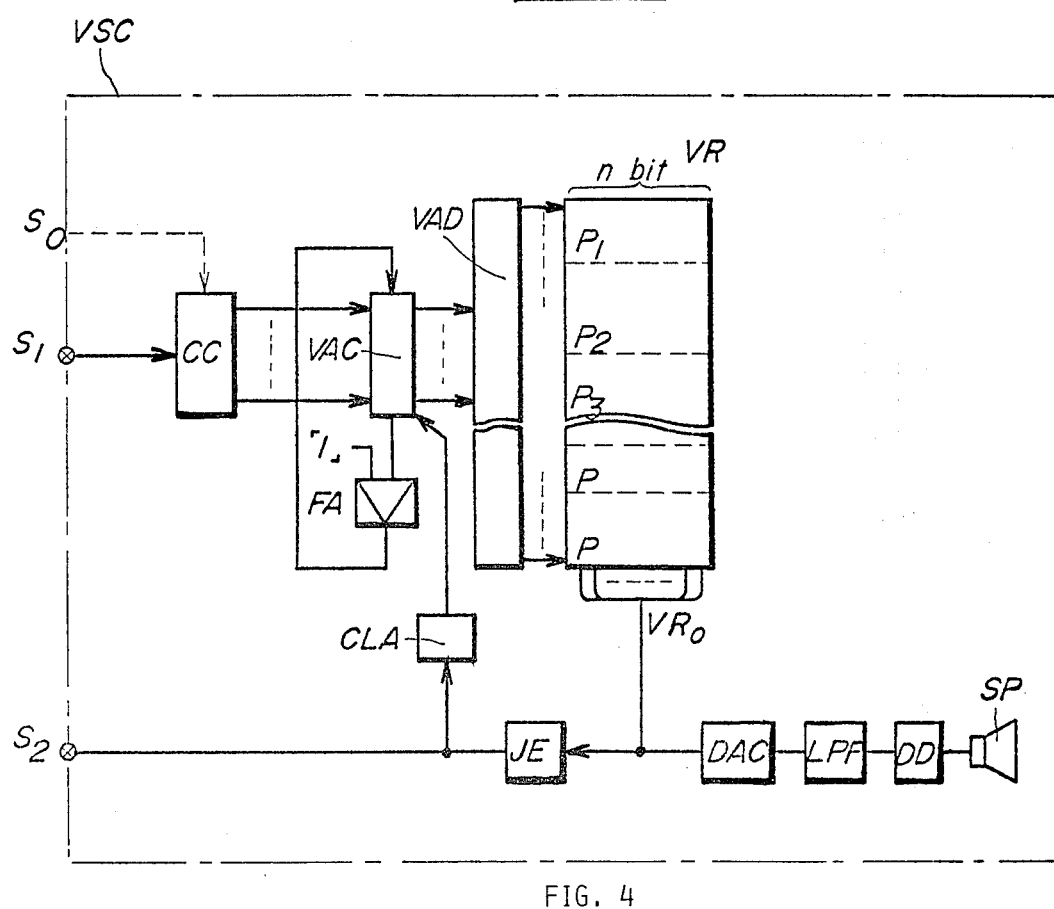
FIG. 4 is a block diagram of an audible output control circuit.
FIG. 5 is a format that of data contained in respective regions of a memory VR.

One way to provide suitable outputs will now be described in great detail. FIG. 4 shows an example of an audible output control circuit VSC which includes the read only memory (ROM) VR containing sound quantizing data therein, an address counter VAC for the memory VR, an address decoder VAD for the memory VR, an adder FA, a reset circuit CLA for VAC, a digital to analog converter DAC, a low pass filter LPF, a loud speaker SP, a speaker driver DD, an END code detector JE, and a code converter CC. The input signal to CC is labeled $S_1$, the output signal from JE is labeled $S_2$, the output signal from VCC is labeled VCC, and the output signal from VR is labeled $VR_0$. $P_1, P_2, \ldots$ represent respective regions for synthesized speech words.

When providing no audible outputs, VAC is reset by CLA. With the address counter VAC in the reset state, no address of VR is there specified nor is any audible output released.

If it is desired to provide a specific audible output, then VAC is set at the initial address of its associated word region P. For example, assuming that the associated word is present within the region $P_2$, the initial address is placed into VAC for $P_2$. Then, the data signal $VR_0$ indicative of that initial address is derived.

FA is the addition circuit which increments by one the address of VAC and thus performs the operation of $VAC+1\rightarrow VAC$. With VAC in the reset state, FA is not operative and the contents of VAC remains unchanged. In other words, VAC is still kept in the reset state.

When the state of $\neq$ "0" is reached upon the arrival at the initial address, the operation $VAC+1\rightarrow VAC$ is automatically executed at a given sampling frequency. Once the initial address is set at VAC, the subsequent addresses are automatically selected step by step. The sound quantizing data $VR_0$ are, therefore, derived in sequence from the region $P_2$.

The output $VR_0$ is converted from a digital form to a corresponding analog form via DAC with its low frequency component passing through LPF. It is desirable to filter the analog output through LPF because the presence of a high frequency component of $VR_0$ may cause the speaker to release noisy or harsh sounds in the event that the quantizing data are converted in a stepwise fashion. The output of LPF enables the loud speaker SP to release agreeable sound outputs via the speaker driver DD in this manner.

The respective data contained within the respective regions of VR, as indicated in FIG. 5, end with an END code placed at the last section thereof. The END code is derived from $VR_0$ immediately upon the completion of the delivery of all the desired audible sounds and sensed by JE, thus rendering CLA operative to reset VAC. Under these circumstances any address of VR is not specified any longer, stopping the delivery of a series of audible sounds. The situation is held until a new initial address is set at VAC.

A code converter CC is adapted to determine a desired initial address in response to a word region specifying signal $S_1$ so as to set the initial address of a desired following word region at VAC.

In the case of providing many words in succession, the output $S_2$ of JE takes the place of the signals $S_1$ corresponding to the next succeeding words.

While the code converter is adapted to determine the address of VR upon the receipt of the word region specifying signal $S_1$, it may have a built-in gate circuit which conveys code converted signals corresponding to the specifying signal $S_1$ into VAC only when a trigger signal $S_0$ comes.

Figure 6:
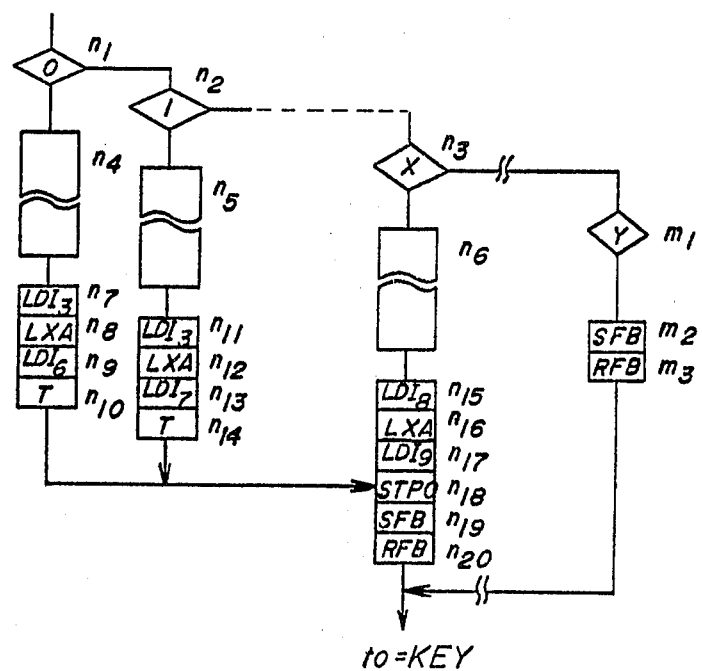
FIGS. 6 and 7 are flow charts for explaining the operation of the calculator.

The operation of a speech-synthesizer apparatus implementing the present invention will be described by reference to flow charts of FIGS. 6 and 7. FIG. 6 depicts the processing events in providing audible sounds indicative of keyed data.

The steps $n_1, n_2, \ldots n_3$ are effected to decide which key is actuated. For example, when a key "0" is depressed, the step is advanced $n_1 \rightarrow n_4$, followed by the conventional key entry procedure for the key "0".

Subsequent to this the delivery of audible sounds is governed in the following manner. During the step $n_7$ an operand $I_3$ is loaded into the accumulator ACC, for example, 4 bits "0000" in the case of actuation of the digit key "0". The contents of ACC are unloaded into the temporary register X during the succeeding step $n_8$. The instruction LDI is led out during $n_9$ (cf. No 12 in the Table 1).

In a given example, the operand assumes "0001" to define the digit key "0", which codes are loaded into the accumulator ACC. The apparatus jumps up to the step $n_{18}$ in response to the T instruction at $n_{10}$. The STPO instruction at $n_{18}$ transfers the contents of the accumulator ACC and the register X into the stack registers SA and SA, respectively. As a result, the contents of the stack registers are as follows:

| SX | SA | |
|---|---|---|
| 0 0 0 0 | 0 0 0 1 | (representing "0") |

The outputs of SX and SA are supplied to the $S_1$ input of the speech-synthesizer circuit VSC. The flag F/F $F_B$ is set during $n_{19}$. The output of $F_B$ is connected to the $S_0$ input of VSC. When $S_0=1$, the codes of SX and SA are sent to the code converter CC of VSC which in turn develops synthesized a word "REI (in Japanese)" or "ZERO (in English)" indicative of the digit "0". $F_B$ which has been set during the step $n_{20}$ is then reset.

Upon the press of a key "X" the conventional entry procedure associated with the key "X" takes place during $n_6$, followed by the step $n_{15}$ of loading a first operand $I_8$ into the accumulator ACC. The first operand $I_8$ is unloaded from ACC to the temporary register X during $n_{16}$. A second operand $I_9$ is introduced into ACC during $n_{17}$. Both the operands are transmitted into the stack registers SX and SA at one time during $n_{18}$. The first and second operands are as follows:

| SX | SA |
|---|---|
| 0 0 0 1 | 0 1 0 1 |
| the first | the second |

As shown above, assuming that both the operands are "0001" and "0101" respectively, SX and SA in combination contain codes "00010101". These codes can be regarded as codes corresponding to "X". The use of 8 bits avoids the disadvantage that only 16 words are possible in the case of 4 bits.

After these codes are contained within SX and SA during $n_{18}$, the flag flip flop $F_B$ is set during $n_{19}$, allowing the code converter CC in VSC to convert these codes. As a result, the initial address of a word "KAKERU (TIME in English)" corresponding to the key "X" is set at the address counter VAC of the memory VR. Thereafter, the audibel word "KAKERU" is provided.

Figure 7:
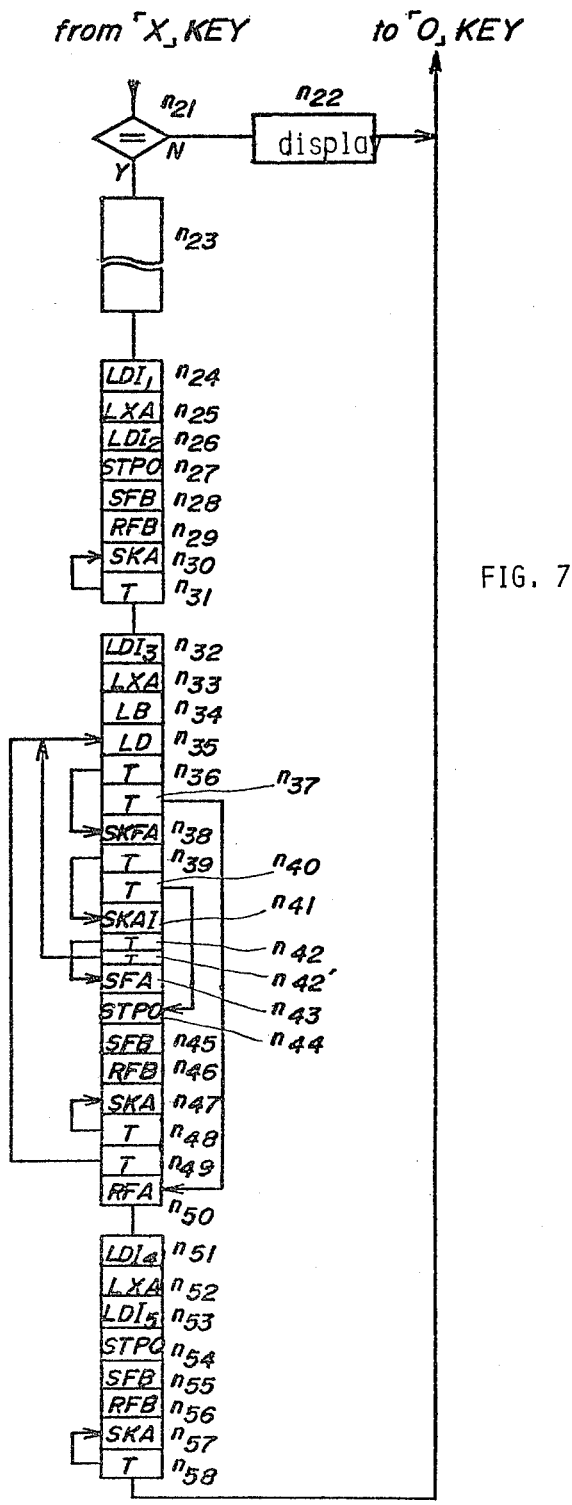

The way of providing audible sounds after the completion of a particular calculation following actuation of an equal key "=" is depicted in a flow chart of FIG. 7.

When the key "=" is not actuated, the apparatus advances to the step $n_{22}$ whereby the contents of a memory $m_1$ are displayed and the key checkup procedure reopens. Upon the actuation of the key "=" the corresponding process is carried out during the step $n_{23}$ with its results loaded into the memory $M_1$ in the conventional way, followed by $n_{24}$.

The steps $n_{24}$–$n_{31}$ are to develop a word or linguistic information "KOTAEWA (ANSWER in English)". The LDI instruction at $n_{24}$ places the upper 4 bits of 8 bits specifying the initial address of VSC containing the word "KOTAEWA". During $n_{25}$ the upper 4 bits are loaded into the temporary register X, whereas the lower 4 bits are loaded into the accumulator ACC during the next step $n_{26}$. The STPO instruction (the instruction No. 52 in Table 1) at $n_{27}$ loades the stack registers SX and SA with these 8 bits. With the flip flop $F_B$ in the set state during the step $n_{28}$, the initial address is set up for the synthesized word "KOTAEWA", thus starting the delivery of the corresponding audible sounds.

The step $n_{30}$, $n_{31}$ are effected to check if the word "KOTAEWA" has been thoroughly announced. Since one input terminal of CPU is coupled with an end signal $S_2$ from VSC, $n_{30} \rightarrow n_{31}$-$n_{31}$ ... are repeated in the absence of the signal $S_2$ (the operand area of the T instruction at $n_{31}$ determines the address during $n_{30}$). Upon the occurrence of the signal $S_2$ the step $n_{32}$ is reached without passing $n_{31}$. The steps $n_{32}$–$n_{50}$ are processed to provide audible sounds while the data within the memory $M_1$ are subject to the so-called zero suppression. As long as they are numerical data, their 4 bits always are full of "0000". To this end the process $n_{32}$ is to load "0000" into the accumulator ACC and the process $n_{33}$ to convey them to the X register.

The LB instruction at $n_{34}$ indicates the most significant digit position of the memory $M_1$. The contents of the memory $M_1$ are unloaded into the accumulator ACC during $n_{35}$. When the process reaches the least significant digit position, the condition BL=V contained within the LD instruction is satisfied, followed by $n_{37}$ other than $n_{36}$. Otherwise, $n_{36}$ comes into effect and $n_{38}$ follows. SKFA contains a decision step as to the state of the flag F/F $F_A$ and thus as to whether the upper data assume "0". If the negative answer is obtained, then $F_A$ is set. Otherwise, $F_A$ is still in the reset state. Therefore, if the most significant digit assumes "0", then the step $n_{39}$ is linked to the step $n_{41}$. SKAI at $n_{41}$ decides whether the contents of the accumulator ACC agree with the operand I which is "0000" in the above example. In other words, it is decided whether the contents of the memory now in ACC are euqal to a decimal number "0". If ACC=0, then the step $n_{42}'$ is effected instead of the step $n_{42}$, followed by $n_{35}$. This procedure is repeated until ACC≠0.

While the LD instruction is being executed during $n_{35}$, the digit address of the memory is progressively incremented. If ACC=0 in this manner, then $n_{41} \rightarrow n_{42} \rightarrow n_{43}$ take place. The step $n_{43}$ places the flip flop $F_A$ into the set state. During the next succeeding step $n_{44}$ the STPO instruction allows the instant numerical codes to be shifted so SX and SA at one time. The flip flop $F_B$ is set at $n_{45}$, thus initiating the procedure of delivering audible sounds indicative of numerical information. The steps $n_{47}$ and $n_{49}$ are to check if the delivery of the audible sounds has been completed. This procedure is repeated until all the necessary audible sounds have been released. Upon the completion of the sound release the apparatus reaches the step $n_{49}$ without passing $n_{48}$ and returns back to $n_{35}$ whereby the next succeeding digit data are unloaded from the memory $M_1$ to the accumulator ACC. While the apparatus goes ahead $n_{35} \rightarrow n_{36} \rightarrow n_{38}$, the flip flop $F_A$ has already been set during the previous step $n_{43}$ so that the apparatus further reaches $n_{40}$ without $n_{37}$ and then $n_{44}$ for the processing of the next digit numerical codes. This procedure is repeated later.

If the second least significant digit position of the memory $M_1$ containing the data is denoted as $n_2$, then $B_L=V(v=n_2)$ at $n_{35}$ following the completion of the release associated with the most significant digit, followed by $n_{37}$ and then $n_{50}$ with skipping $n_{36}$. $F_A$ is then reduced into the reset state to thereby terminate the delivery of a series of audible outputs.

The steps $n_{51}$–$n_{56}$ thereafter become operative to provide audible sounds indicative of "DESU" (corresponds to "IS" in English with a difference in position between the Japanese and English sentences) according to the teaching of the present invention.

The step $n_{51}$ is effected to load the upper 4 bits of the codes indicative of the synthesized word "DESU" into the accumulator ACC, the upper 4 bits being then transferred into the X register at $n_{52}$ whereas the lower 4 bits are loaded into the accumulator ACC during $n_{53}$. Both these 4 bits are sent to the stack registers SX and SA at one time. The flip flop $F_B$ is set at $n_{55}$, allowing the sound output control circuit VSC to provide the sounds "DESU". The steps $n_{57}$ and $n_{58}$ recover the initial settings after the completion of the sound output "DESU" and thus keeps the word "DESU" from being interrupted on the way. It will be understood that the above described steps $n_1$, $n_2$ ... $n_3$, $n_{21}$ and $n_{22}$ depend upon the function procedure (XV) of the CPU architecture.

In this manner, linguistic intelligences other than numerical intelligences, such as the above described the word "DESU" are able to be created after the numerical intelligences reflecting the body of calculation results are audibly displayed, thus establishing a distinction between audible sounds at the time of key entry and the audible display of the calculation results. As an alternative, the linguistic intelligences such as the word "KOTAE" can be provided audibly immediately before the calculation results are displayed Referring to FIG. 6, the steps $m_1$–$m_3$ are additional ones which allow the contents of a preceding key to be displayed in the form of audible sounds upon actuation of a key "V" of FIG. 1. Upon actuation of a key "X" the step is advanced from $m_1 \rightarrow m_2$ to set the flag F/F $F_B$. After the actuation of the keys there is a checkup as to the respective keys "0", "1", ... "X".

The STPO instruction at $n_{18}$ loads the keyed codes into the stack registers SX and SA, these keyed codes being held unchanged as long as any different key is not actuated. Therefore, the flip flop $F_B$ is set. If the trigger input $S_0$ of VSC is supplied with the output $F_B$, then those keyed codes contained within the stack registers SX and SA are interpreted through VSC to thereby provides their corresponding audible sounds. The step $m_3$ is to reset $F_B$ and revert the apparatus to its initial state. In this manner the actuation of the key "V" enables a preceding actuated key to be displayed in the form of audible sounds.

Whereas the present invention has been described with respect to specific embodiments thereof, it will be understood that various changes and modifications will be suggested to those skilled in the art, and it is intended to encompass such changes and modifications as fall within the scope of the appended claims.

We claim:

1. A data related apparatus including a key input device for introducing data and function information into said data related apparatus, a processor for processing said data in accordance with said function information to produce a processed result, and a speech synthesizer output device for developing a first type of audible sound indicative of said data entered via said key input device, a second type of audible sound indicative of said function information entered via said key input device, a third type of audible sound indicative of said processed result, and a fourth type of audible sound disposed in time sequence subsequently to the first and second types of audible sounds and prior to said third type of audible sound for distinguishing between the introduced data and function information and the processed result, said speech synthesizer output device comprising:

means for developing a fifth type of audible sound interposed in time sequence between said fourth type of audible sound and said third type of audible sound for further distinguishing between the introduced data and function information and the processed result by audibly indicating that the development of said third type of audible sound indicative of said processed result is forthcoming.

2. A data related apparatus in accordance with claim 1, wherein the fourth and fifth types of audible sounds comprise spoken words.

3. A data related apparatus in accordance with claim 2, wherein said processor and said speech synthesizer output device are implemented within a microprocessor unit.

4. A data related apparatus in accordance with claim 2, wherein the spoken word of said fourth type of audible sound comprises the word "equals".

5. A data related apparatus in accordance with claim 2, wherein the spoken words of said fifth type of audible sound comprise the words "answer is".

* * * * *